US009953333B1

(12) United States Patent
Ng et al.

(10) Patent No.: US 9,953,333 B1
(45) Date of Patent: Apr. 24, 2018

(54) SYSTEMS AND METHODS FOR USE OF TRANSACTION DATA FOR CUSTOMERS

(71) Applicant: JPMorgan Chase Bank, N.A., New York, NY (US)

(72) Inventors: Steven Ng, Newark, DE (US); Ravi Acharya, Philedelphia, PA (US); Christopher R. Conrad, Philedelphia, PA (US); Lee Knackstedt, Bear, DE (US); William F. Mann, III, Avondale, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 344 days.

(21) Appl. No.: 14/708,571

(22) Filed: May 11, 2015

Related U.S. Application Data

(63) Continuation of application No. 12/272,004, filed on Nov. 17, 2008, now Pat. No. 9,031,866.

(51) Int. Cl.
*G06Q 30/02* (2012.01)
*G06Q 30/06* (2012.01)

(52) U.S. Cl.
CPC ..... *G06Q 30/0203* (2013.01); *G06Q 30/0255* (2013.01); *G06Q 30/0613* (2013.01)

(58) Field of Classification Search
None
See application file for complete search history.

(56) References Cited

U.S. PATENT DOCUMENTS

| | | | |
|---|---|---|---|
| 5,765,140 | A | 6/1998 | Knudson et al. |
| 5,819,226 | A | 10/1998 | Gopinathan et al. |
| 5,835,087 | A | 11/1998 | Herz et al. |

(Continued)

OTHER PUBLICATIONS

"Operator Scheduling in a Data Stream Manager", by Don Carney et al., Department of Computer Science, Brown University, Proceedings of the 29th VLDB Conference, Berlin, Germany, 2013, 12 pages.

(Continued)

*Primary Examiner* — Paul Danneman
(74) *Attorney, Agent, or Firm* — Hunton & Williams LLP

(57) ABSTRACT

The invention provides a system and method for using transaction data to provide information to a customer, the information being provided in response to a request from the customer so as to assist the customer in decisioning. The method may comprising inputting transaction data regarding a plurality of transactions effected at a plurality of merchants; inputting a request for information from a requesting customer, the request including parameters related to the request; performing processing based on both the transaction data and the request for information, the processing including generating a response to the request; and outputting the response to the requesting customer. The request and processing may relate to identifying activities of similarly situated persons vis-à-vis the requesting customer, based on the transaction data. The request may relate to identifying an optimum merchant to secure purchase of a target item. Further, the request may relate to determining an optimum sequence in which to perform a plurality of desired activities. Various other features are described.

19 Claims, 20 Drawing Sheets

Real time merchant transaction data 11
Historical merchant transaction data 12
Customer Request for financial based Information (submitted via an Internet based device, e.g.) 16
Working merchant transaction data 14
Customer Profile 18
Static profile data (Remains static between requests)
Dynamic profile data (Generated for particular request)
Processing 10
Response to customer request for information 20

(56) References Cited

U.S. PATENT DOCUMENTS

| | | | |
|---|---|---|---|
| 5,918,207 | A | 6/1999 | McGovern et al. |
| 5,974,396 | A | 10/1999 | Anderson et al. |
| 6,415,259 | B1 | 7/2002 | Wolfinger et al. |
| 6,430,539 | B1 | 8/2002 | Lazarus et al. |
| 6,505,168 | B1 | 1/2003 | Rothman et al. |
| 6,938,048 | B1 | 8/2005 | Jilk et al. |
| 6,963,850 | B1 * | 11/2005 | Bezos ............... G06F 17/30867 705/26.41 |
| 7,165,256 | B2 | 1/2007 | Boudnik et al. |
| 7,376,431 | B2 | 5/2008 | Niedermeyer |
| 7,669,759 | B1 | 3/2010 | Zettner |
| 7,720,707 | B1 * | 5/2010 | Mowry .................. G06Q 30/02 705/14.1 |
| 7,996,458 | B2 | 8/2011 | Nielsen et al. |
| 8,175,908 | B1 | 5/2012 | Anderson |
| 2002/0052782 | A1 | 5/2002 | Landesmann |
| 2003/0074401 | A1 | 4/2003 | Connell et al. |
| 2003/0167199 | A1 | 9/2003 | Thomann et al. |
| 2004/0200898 | A1 | 10/2004 | Kepecs |
| 2005/0240916 | A1 | 10/2005 | Sandrew |
| 2006/0155569 | A1 | 7/2006 | Lord et al. |
| 2007/0260521 | A1 | 11/2007 | Van Der Riet |
| 2008/0121696 | A1 | 5/2008 | Mock et al. |
| 2010/0088148 | A1 | 4/2010 | Presswala et al. |

OTHER PUBLICATIONS

"Dynamic Workforce Scheduling for British Telecommunications PLC", by David Lesaint et al., Interfaces 30; Jan.-Feb. 2000, ABI/INFORM Global, pp. 45-56 (12 pages).

"RainMan: A Workflow System for the Internet", by Santana Paul et al., Proceedings USENIX Symposium on Internet Technologies and System, Monterey, Cal. (1997), 12 pages.

"Automating the Business Process of Mission-Critical Distributed Applications", by Paul Butterworth, Forté Software, Inc., Apr. 1997, 27 pages.

"A Method for Balancing Loads in Workflow Management Systems with Web Services", by Hideyuki Katoh et al., Department of Computer Science, Tokyo Institute of Technology, Tokyo, Japan, May 2006, 13 pages.

* cited by examiner

300 Input raw data (on an ongoing basis) (from Fig. 2)
310 Input customer data (and register or update customer)
320 Input raw merchant transaction data
330 Input raw traffic data
340 Input other raw data
350 Return to Fig. 2 (step 400)

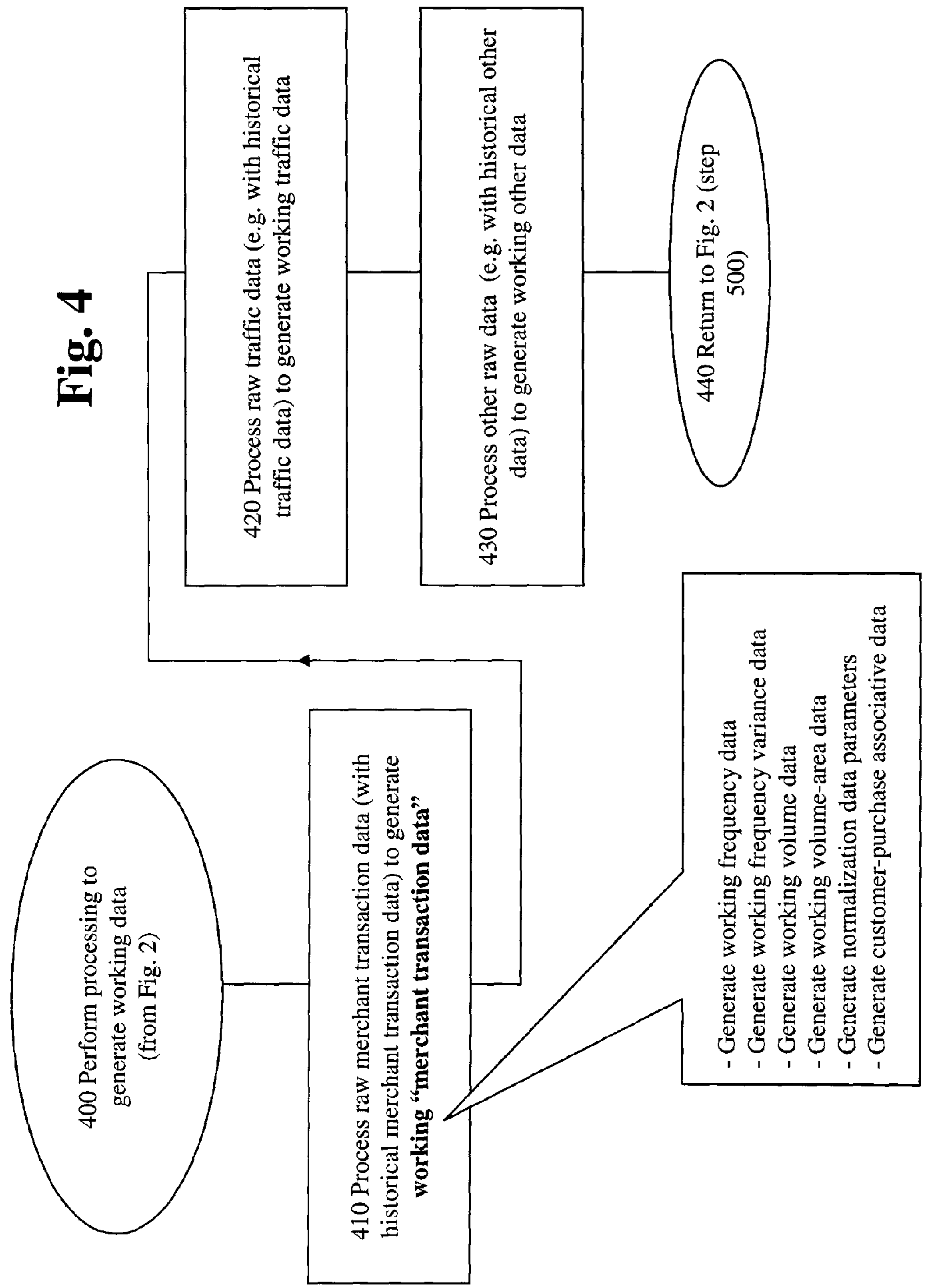
Fig. 4
400 Perform processing to generate working data (from Fig. 2)
410 Process raw merchant transaction data (with historical merchant transaction data) to generate working "merchant transaction data"
- Generate working frequency data
- Generate working frequency variance data
- Generate working volume data
- Generate working volume-area data
- Generate normalization data parameters
- Generate customer-purchase associative data
420 Process raw traffic data (e.g. with historical traffic data) to generate working traffic data
430 Process other raw data (e.g. with historical other data) to generate working other data
440 Return to Fig. 2 (step 500)

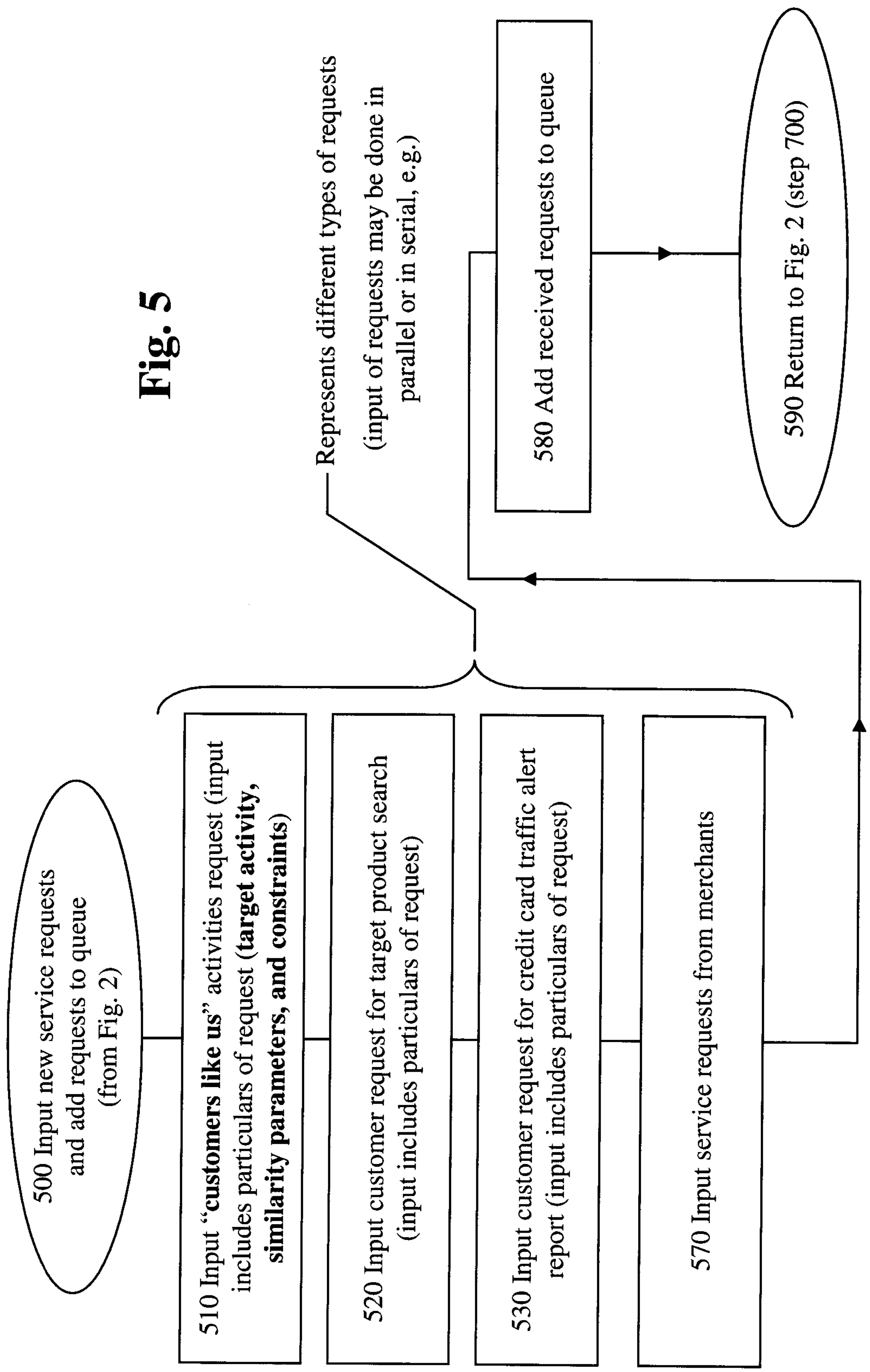
Fig. 5
500 Input new service requests and add requests to queue (from Fig. 2)
510 Input "customers like us" activities request (input includes particulars of request (target activity, similarity parameters, and constraints)
520 Input customer request for target product search (input includes particulars of request)
530 Input customer request for credit card traffic alert report (input includes particulars of request)
570 Input service requests from merchants
Represents different types of requests (input of requests may be done in parallel or in serial, e.g.)
580 Add received requests to queue
590 Return to Fig. 2 (step 700)

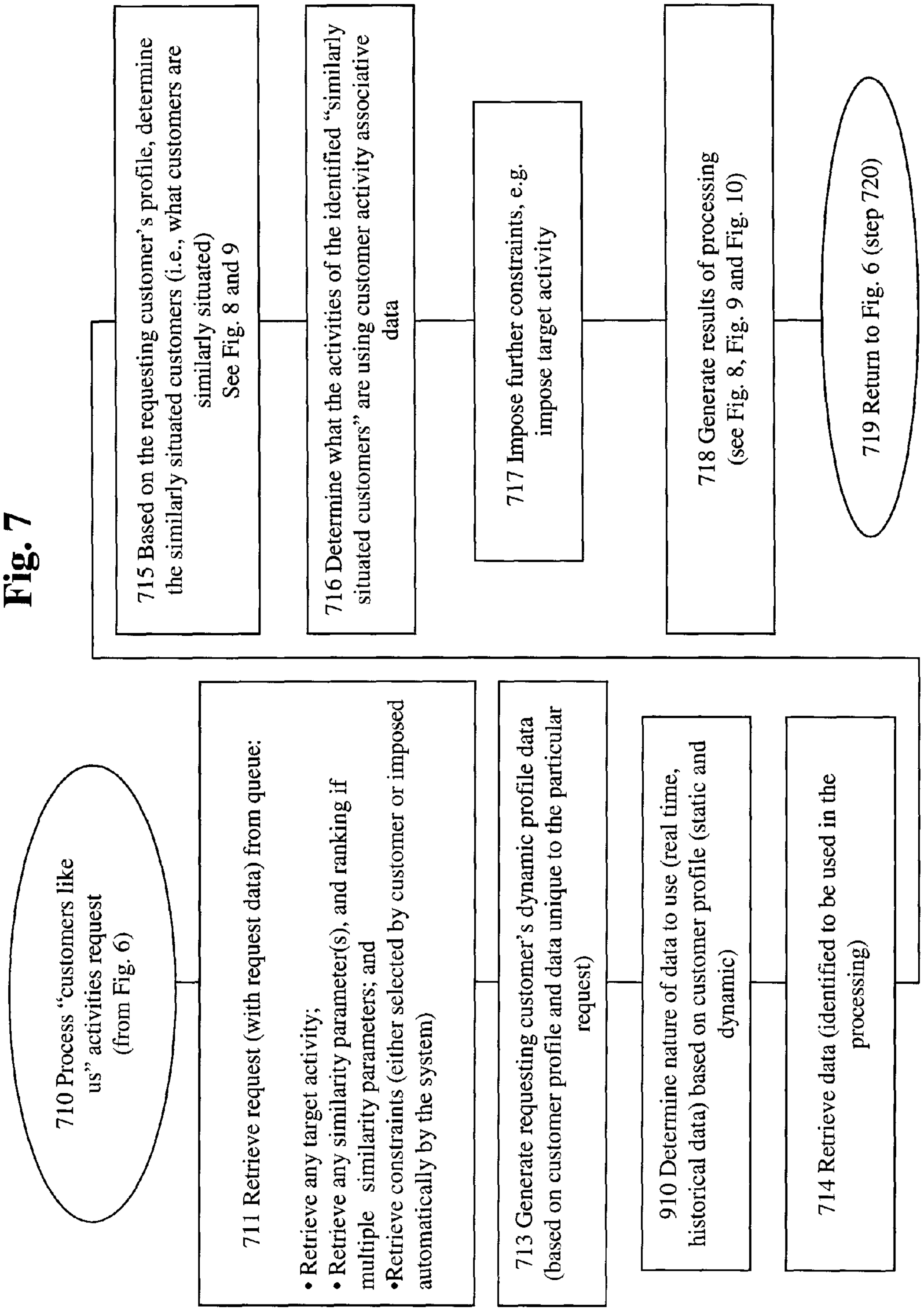
Fig. 7
710 Process "customers like us" activities request (from Fig. 6)
711 Retrieve request (with request data) from queue:
• Retrieve any target activity;
• Retrieve any similarity parameter(s), and ranking if multiple similarity parameters; and
•Retrieve constraints (either selected by customer or imposed automatically by the system)
713 Generate requesting customer's dynamic profile data (based on customer profile and data unique to the particular request)
910 Determine nature of data to use (real time, historical data) based on customer profile (static and dynamic)
714 Retrieve data (identified to be used in the processing)
715 Based on the requesting customer's profile, determine the similarly situated customers (i.e., what customers are similarly situated)
See Fig. 8 and 9
716 Determine what the activities of the identified "similarly situated customers" are using customer activity associative data
717 Impose further constraints, e.g. impose target activity
718 Generate results of processing (see Fig. 8, Fig. 9 and Fig. 10)
719 Return to Fig. 6 (step 720)

SIMILARITY TO A REQUESTING CUSTOMER

For database customer (N+1)

| Similarity parameter | Comparison value (degree of compare) | Customer similarity parameter preference | Calculated Rank Value |
|---|---|---|---|
| Income | 9 | 5 | 45 |
| Location | 8 | 9 | 72 |
| Spending | 6 | 6 | 36 |
| Total for customer | | | 153 |

For database customer (N+2)

| Similarity parameter | Comparison value (degree of compare) | Customer similarity parameter preference | Calculated Rank Value |
|---|---|---|---|
| Income | 8 | 5 | 40 |
| Location | 9 | 9 | 81 |
| Spending | 6 | 6 | 36 |
| Total for customer | | | 157 |

Total calculated rank value for database customer vis-à-vis requesting customer

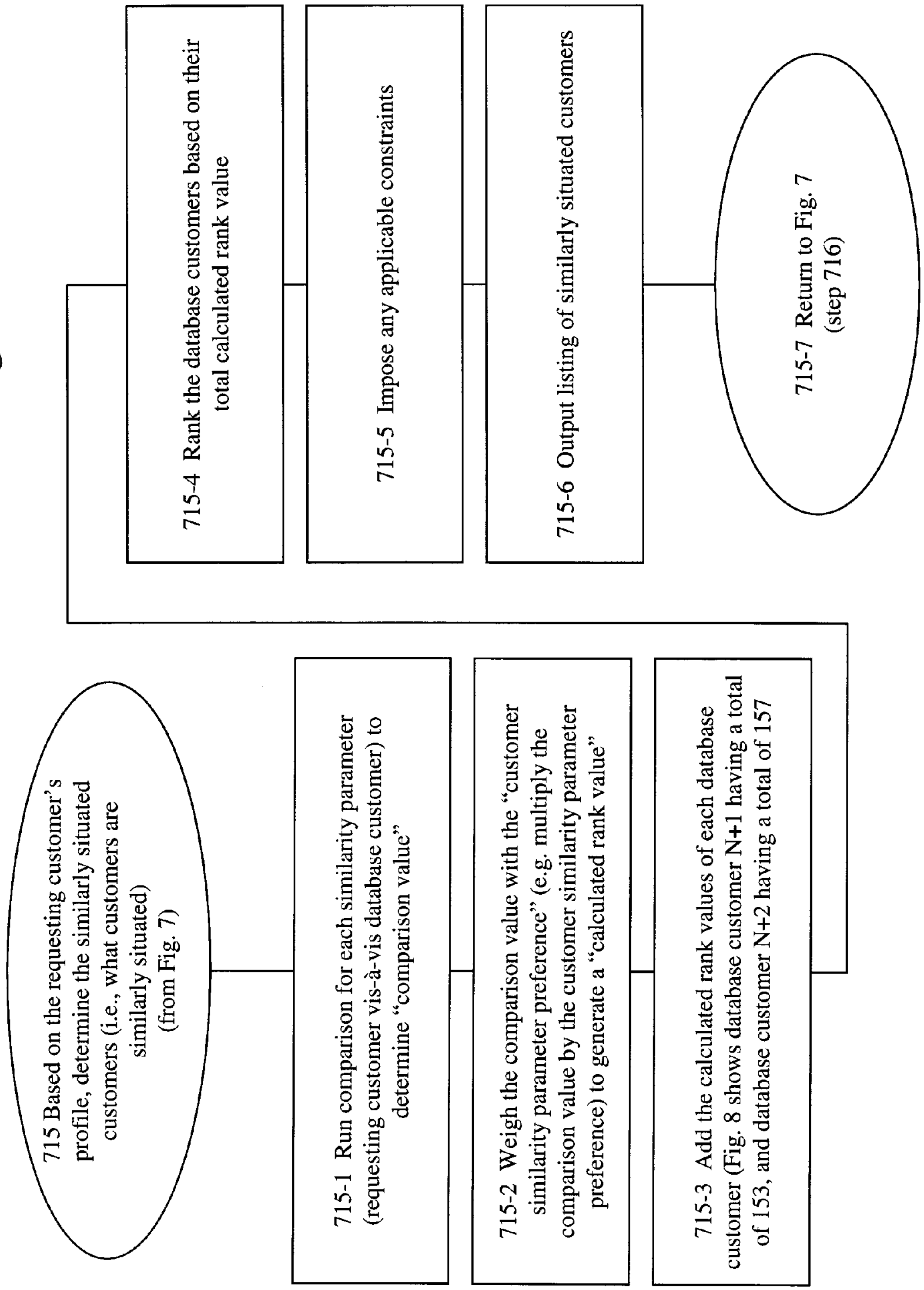
Fig. 9
715 Based on the requesting customer's profile, determine the similarly situated customers (i.e., what customers are similarly situated) (from Fig. 7)
715-1 Run comparison for each similarity parameter (requesting customer vis-à-vis database customer) to determine "comparison value"
715-2 Weigh the comparison value with the "customer similarity parameter preference" (e.g. multiply the comparison value by the customer similarity parameter preference) to generate a "calculated rank value"
715-3 Add the calculated rank values of each database customer (Fig. 8 shows database customer N+1 having a total of 153, and database customer N+2 having a total of 157
715-4 Rank the database customers based on their total calculated rank value
715-5 Impose any applicable constraints
715-6 Output listing of similarly situated customers
715-7 Return to Fig. 7 (step 716)

718 Generate results of processing (from Fig. 7)
718-1 Generate report of activities of similarly situated customers
-Merchants shopped report
- Venues report
- Restaurants dined report
- Timing data report (e.g. when - merchants shopped or restaurants dined)
- Hobbies report
718-2 Generate output of results for other processing
718-3 Return to Fig. 7 (step 719)

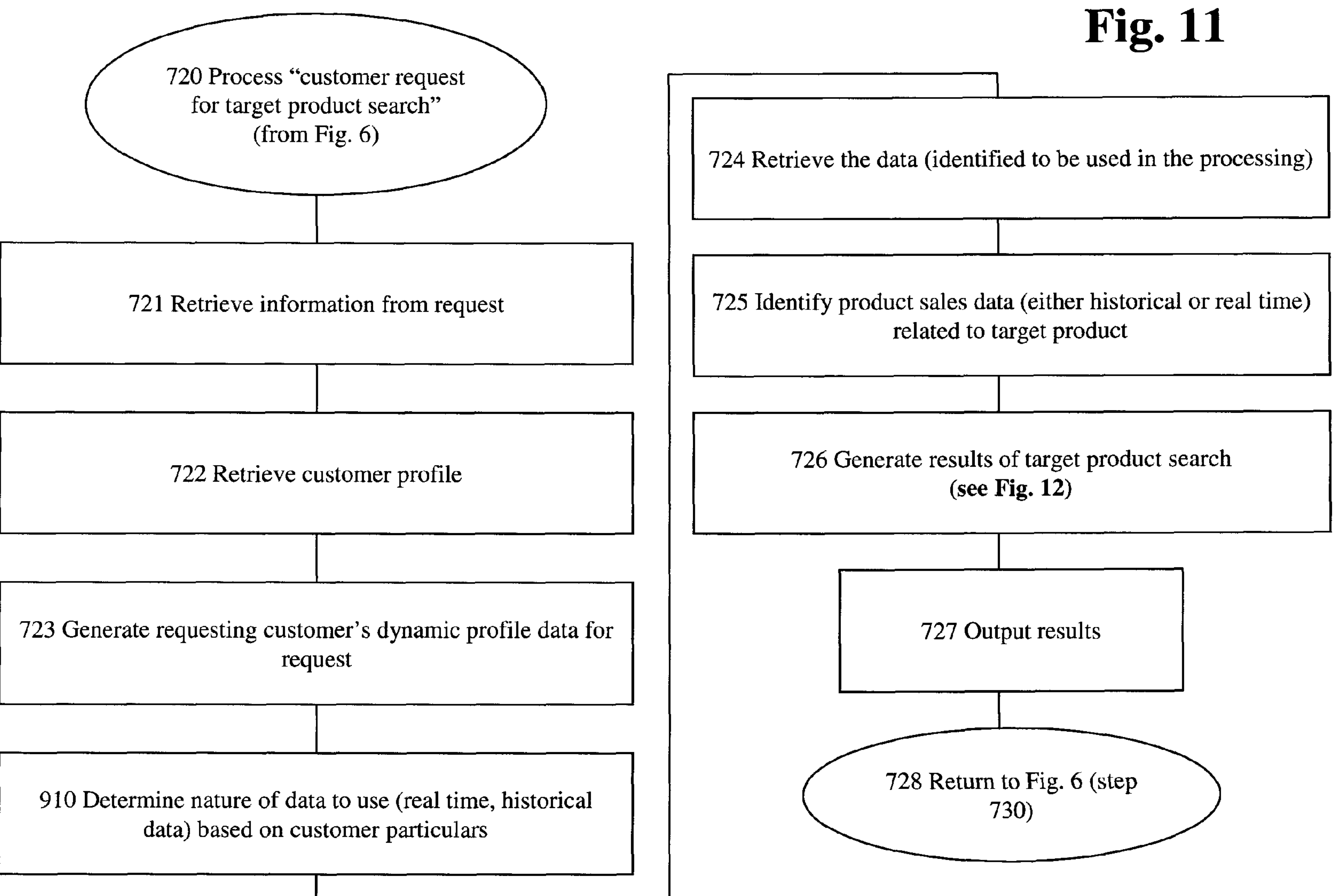

Fig. 11
720 Process "customer request for target product search" (from Fig. 6)
721 Retrieve information from request
722 Retrieve customer profile
723 Generate requesting customer's dynamic profile data for request
910 Determine nature of data to use (real time, historical data) based on customer particulars
724 Retrieve the data (identified to be used in the processing)
725 Identify product sales data (either historical or real time) related to target product
726 Generate results of target product search (see Fig. 12)
727 Output results
728 Return to Fig. 6 (step 730)

Fig. 13

Weighting of parameters may be varied based on customer input

| | Name of product identified | Price of product identified | Merchant where product identified | Distance from customer home zip to merchant | Product rank value |
|---|---|---|---|---|---|
| Target product identified (result 1) | Printer XYZ | $47.00 | Merchant XYZ (Phone) xxx-xxx-xxxx | 5 miles | 9.1 |
| Target product identified (result 2) | Printer ZZZ | $44.00 | Joe Wholesale (Phone) xxx-xxx-xxxx | 15 miles | 8.7 |
| Target product identified (result 3) | Printer YYY | $52.00 | Ben Outlets (Phone) xxx-xxx-xxxx | 16 miles | 8.5 |

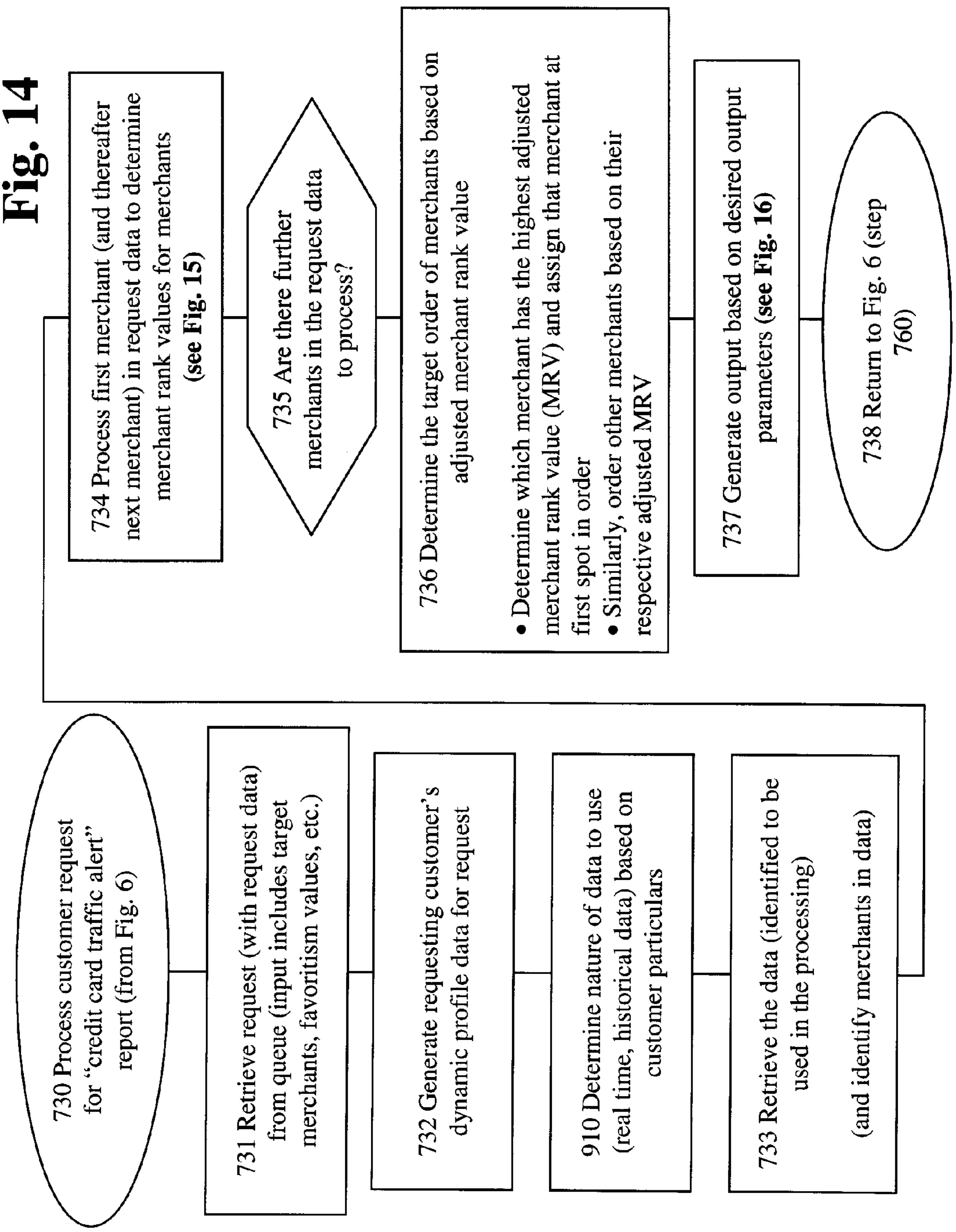
Fig. 14
730 Process customer request for "credit card traffic alert" report (from Fig. 6)
731 Retrieve request (with request data) from queue (input includes target merchants, favoritism values, etc.)
732 Generate requesting customer's dynamic profile data for request
910 Determine nature of data to use (real time, historical data) based on customer particulars
733 Retrieve the data (identified to be used in the processing)
(and identify merchants in data)
734 Process first merchant (and thereafter next merchant) in request data to determine merchant rank values for merchants (see Fig. 15)
735 Are there further merchants in the request data to process?
736 Determine the target order of merchants based on adjusted merchant rank value
• Determine which merchant has the highest adjusted merchant rank value (MRV) and assign that merchant at first spot in order
• Similarly, order other merchants based on their respective adjusted MRV
737 Generate output based on desired output parameters (see Fig. 16)
738 Return to Fig. 6 (step 760)

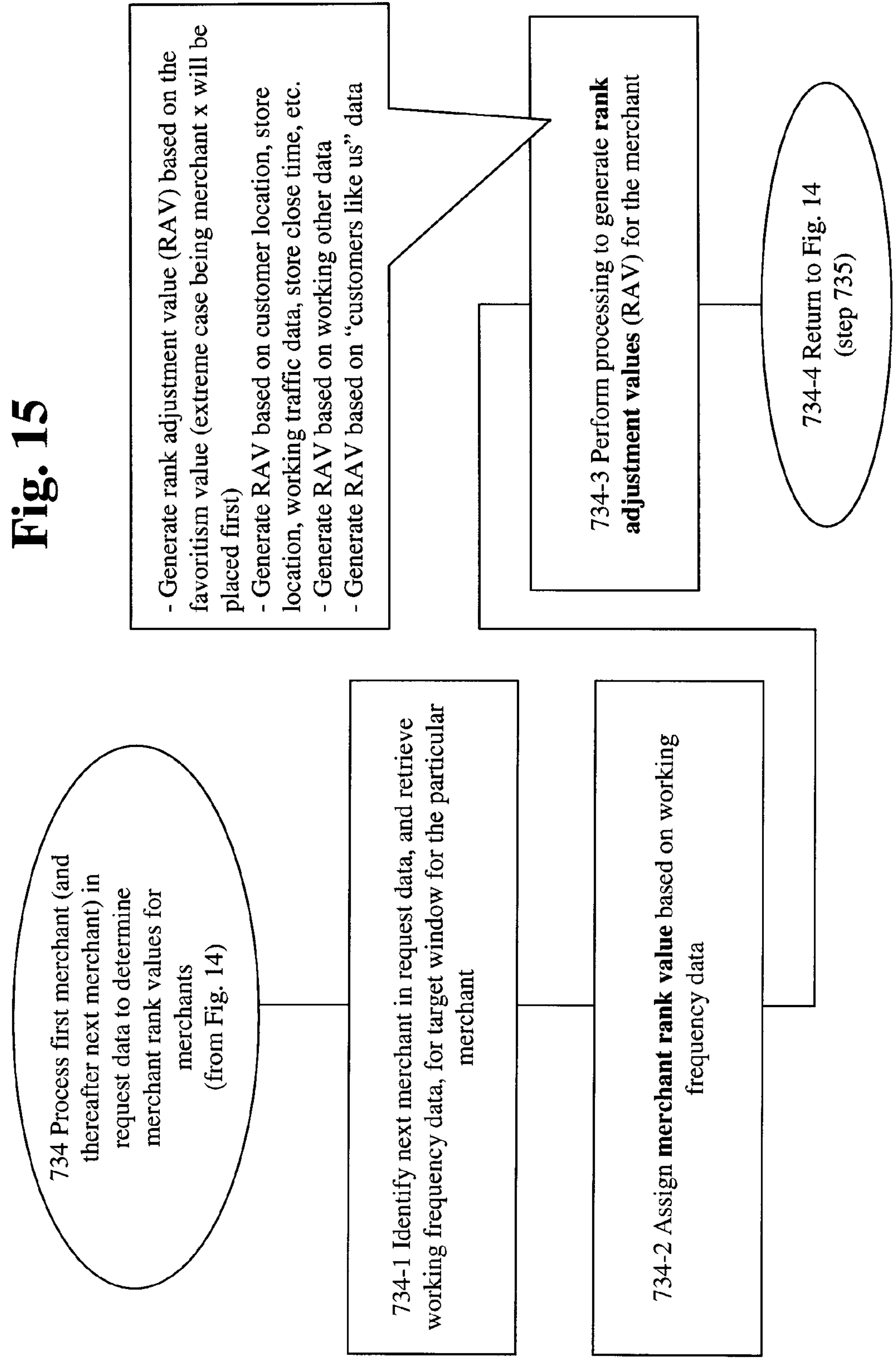

Fig. 15
734 Process first merchant (and thereafter next merchant) in request data to determine merchant rank values for merchants (from Fig. 14)
734-1 Identify next merchant in request data, and retrieve working frequency data, for target window for the particular merchant
734-2 Assign merchant rank value based on working frequency data
734-3 Perform processing to generate rank adjustment values (RAV) for the merchant
- Generate rank adjustment value (RAV) based on the favoritism value (extreme case being merchant x will be placed first)
- Generate RAV based on customer location, store location, working traffic data, store close time, etc.
- Generate RAV based on working other data
- Generate RAV based on "customers like us" data
734-4 Return to Fig. 14 (step 735)

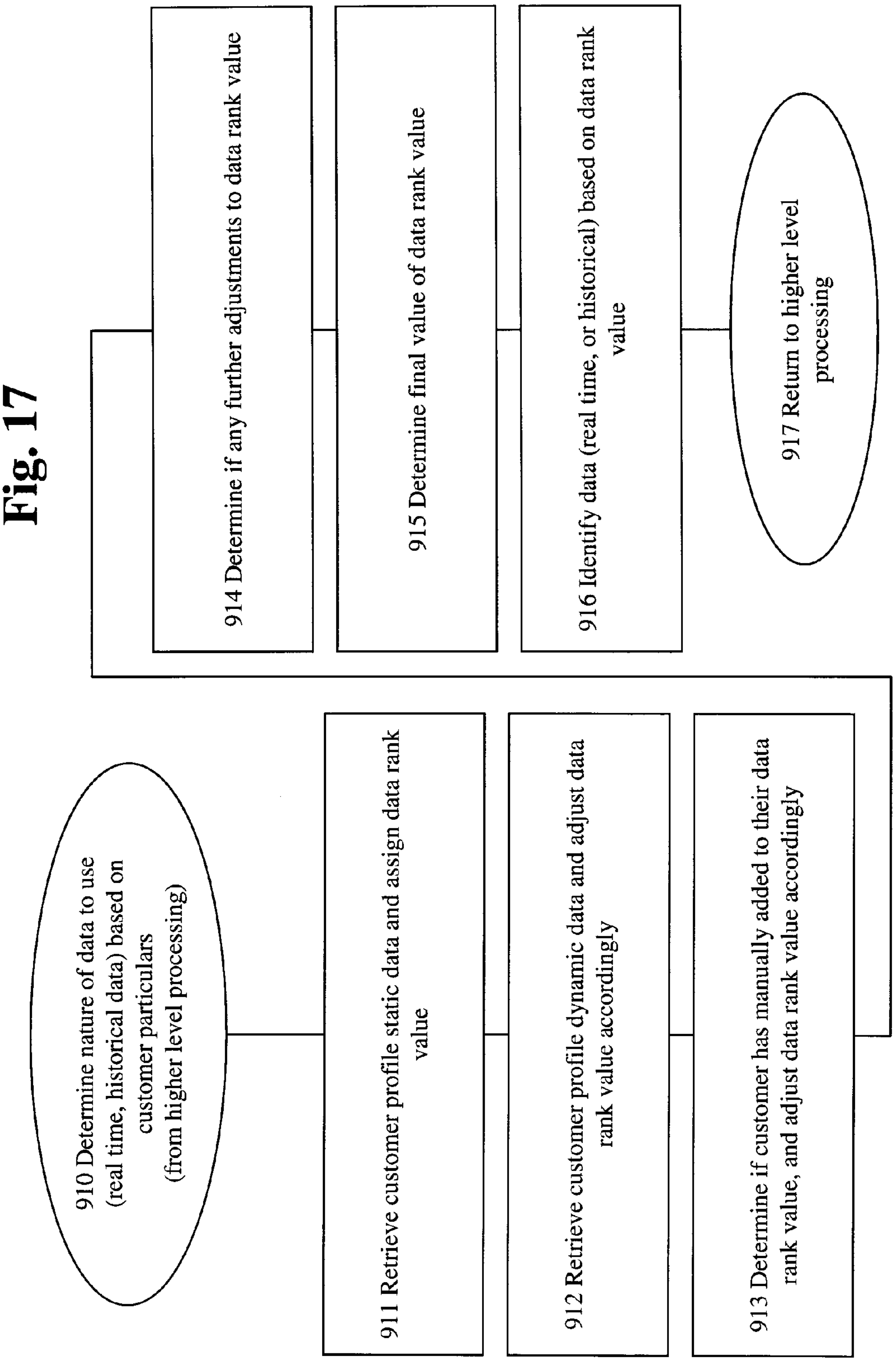
Fig. 17
910 Determine nature of data to use (real time, historical data) based on customer particulars (from higher level processing)
911 Retrieve customer profile static data and assign data rank value
912 Retrieve customer profile dynamic data and adjust data rank value accordingly
913 Determine if customer has manually added to their data rank value, and adjust data rank value accordingly
914 Determine if any further adjustments to data rank value
915 Determine final value of data rank value
916 Identify data (real time, or historical) based on data rank value
917 Return to higher level processing

SYSTEMS AND METHODS FOR USE OF TRANSACTION DATA FOR CUSTOMERS

RELATED APPLICATION

This patent application is a continuation of U.S. patent application Ser. No. 12/272,004 filed Nov. 17, 2008, which is incorporated herein by reference in its entirety and to which priority is claimed.

BACKGROUND OF THE INVENTION

Transaction data, resulting from the purchasing activities of customers, provides a rich and ongoing stream of information. In the financial industry, such transaction data is leveraged in a variety of ways. However, known techniques are still lacking in fully using such transaction data to its fullest potential.

BRIEF SUMMARY OF THE INVENTION

The invention provides a system and method for using transaction data to provide information to a customer, the information being provided in response to a request from the customer so as to assist the customer in decisioning. The method may comprising inputting transaction data regarding a plurality of transactions effected at a plurality of merchants; inputting a request for information from a requesting customer, the request including parameters related to the request; performing processing based on both the transaction data and the request for information, the processing including generating a response to the request; and outputting the response to the requesting customer. The request and processing may relate to identifying activities of similarly situated persons vis-à-vis the requesting customer, based on the transaction data. The request may relate to identifying an optimum merchant to secure purchase of a target item. Further, the request may relate to determining an optimum sequence in which to perform a plurality of desired activities. Various other features are described.

BRIEF DESCRIPTION OF THE DRAWINGS

The present invention can be more fully understood by reading the following detailed description together with the accompanying drawings, in which like reference indicators are used to designate like elements, and in which:

FIG. 4 is a flowchart showing further details of the processing to generate working data, in accordance with one embodiment of the invention;

FIG. 5 is a flowchart showing further details of the "input new service requests and add request to queue" processing of FIG. 2, in accordance with one embodiment of the invention;

FIG. 7 is a flowchart showing further details of the processing of a "customers like us" activities request of FIG. 6, in accordance with one embodiment of the invention;

FIG. 8 is a diagram showing aspects of the processing of FIG. 7, in accordance with one embodiment of the invention;

FIG. 9 is a flowchart showing details of the processing of the determination of the similarly situated customers of FIG. 7, in accordance with one embodiment of the invention;

FIG. 11 is a flowchart showing further details of the "process customer request for target product search" of FIG. 6, in accordance with one embodiment of the invention;

FIG. 13 is a table showing illustrative results, in accordance with one embodiment of the invention;

FIG. 14 is a flowchart showing further details of the "process customer request for 'credit card traffic alert' report" of FIG. 6, in accordance with one embodiment of the invention;

FIG. 15 is a flowchart showing further details of the processing of the merchants of FIG. 14, in accordance with one embodiment of the invention.

FIG. 17 is a flowchart showing further details of the "determine nature of data to use (real time, historical data) based on customer particulars" processing, in accordance with one embodiment of the invention;

DETAILED DESCRIPTION OF THE INVENTION

Figure 1:
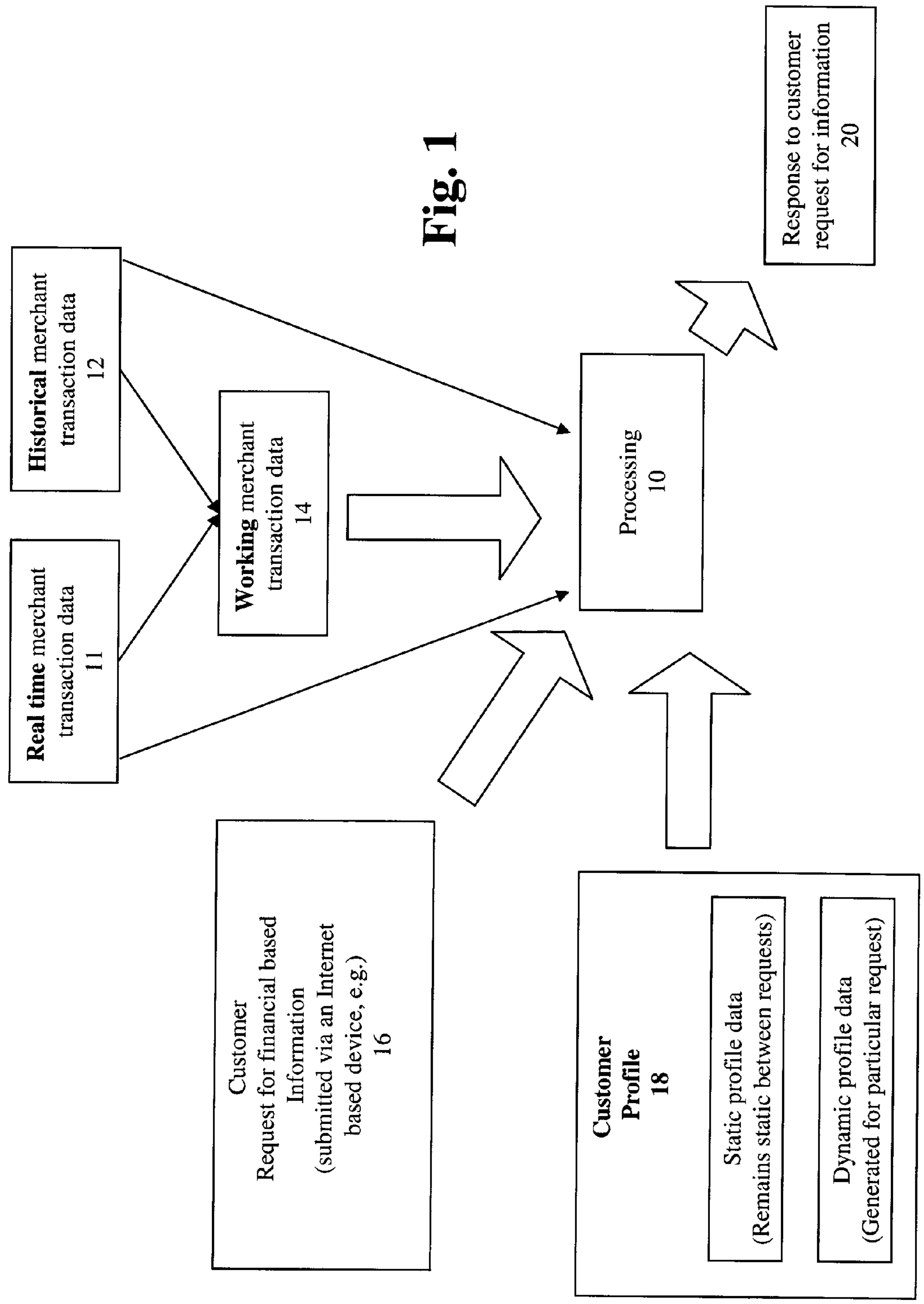
FIG. 1 is a diagram showing high level aspects in accordance with one embodiment of the invention.

Hereinafter, aspects of the invention in accordance with various embodiments will be described. As used herein, any term in the singular may be interpreted to be in the plural, and alternatively, any term in the plural may be interpreted to be in the singular.

The invention provides a variety of processing to leverage transaction data, resulting from purchasing activities of customers. In one aspect, the invention provides information to customers relating to what activities other similarly situated customers are engaged in. In another related aspect, the invention provides information to customers relating to "congestion" of credit card traffic in various stores. Various other features are described herein.

The invention provides a variety of processing to leverage transaction data, resulting from purchasing activities, and in particular purchasing activities of customers. Specifically, the invention aggregates transaction data in specific manners, and based on specific criteria, so as to provide useful information to customers and/or to merchants. Such transaction data might flow from credit card transactions, for example.

In one aspect, the invention provides information to customers relating to what activities other similarly situated customers are engaged in. For example, such information allows a customer belonging to the mass affluent to see what other mass affluents are doing, so that they might also participate in such activities and/or purchases.

In one embodiment of the invention, customers are put into different profiles. Customers are then associated with other customers possessing the same, or sufficiently similar, profiles, e.g. a grouping of customers based on their profiles is performed. For a particular customer, the invention then determines what other customers in the same group are doing. Such processing might be characterized as trend data and/or allowing customers to know what "people like them" do. In a further related aspect of the invention, a customer is provided information associating customer activities between different merchants. Such may include data reflecting that customers who shopped at store X also shopped at store Y. The analysis may be overlaid with other data/attributes, i.e., customers who shopped at store X, spend $1,000 a month on their credit card, and are categorized as mass affluent—also shopped at store Y. In general, the processing may utilize data across multiple merchants.

The invention provides various other related processing. For example, a customer may opt into a different group. For example, a customer with median income might be provided with information regarding high income persons, e.g. at what restaurants high income persons eat.

In another related aspect, the invention provides information to customers relating to "congestion" of credit card traffic in various stores. Based on such credit card congestion information, the customer may strategically choose their activities, e.g. the order of stores to shop. In one vein, such processing goes to "ease of life" of the customer.

For example, in an ongoing manner, the invention inputs transaction data from a particular BEST BUY store. Using base line data (or other attributes associated with the particular store), the processing determines that the store is experiencing high traffic. This information is output to a customer. The customer, based on such information, might then opt to run other errands, and wait for the traffic at the BEST BUY to slow down. The credit card congestion information may also be synthesized with other data, such as geographical data, GPS data, traffic data, data regarding the flow of a particular intersection, data regarding parking availability and parking options, and/or information from cameras (such as a camera from a particular intersection or from a parking lot). Such other data might be synthesized with the credit card congestion information so as be processed together and/or such other data might simply be forwarded directly to the customer. For example, the camera images might be output directly to the customer. For example, a customer might be prompted (by the processing) to go to a relatively high congestion store, because it is adjacent the store in which they are currently shopping. Thus, the processing of the invention allows a customer to strategically plan their day, e.g. by determining the most effective order of stores to shop.

The processing may include providing information to a customer based on the customer's status. That is, a platinum preferred customer might receive congestion information in real time. On the other hand, a silver member might receive congestion information in a delayed manner.

Aspects of the invention may be used by merchants. For example, a customer might receive offers, e.g. be "popped" offers, based on congestion information. Offers might be based on historical congestion data and/or real time congestion data. The offer might be tied to a particular time window (e.g. 7 am to 9 am) or dynamically change. For example, a merchant might provide a particular offer (and notify the customer of the offer) when congestion in the merchant's store drops below a particular level.

A customer might be provided transaction data/congestion manner in a variety of ways. Indeed, the customer might selectively choose the manner. For example, a customer might enter the stores they want to shop, and, in response, the processing outputs the order of stores. On the other hand, the processing might provide the customer the transaction data/congestion manner in more of a raw format. Such would allow the customer to synthesize the data as they deemed appropriate. Indeed, such processing lends itself to a "gaming" component in which the customer sees how quickly they can advance through needed purchases.

Another embodiment relates to use of detailed data about transactions (e.g. "Level 3 data"). Such data can be captured to provide trending and possible predictive services to customers. One example would be the cost of gasoline at individual service stations. The processing could provide trends and last price per gallon at individual stations. That would allow a customer to compare prices at the Shell on Walnut Street, compared to Hess on Market Street, one block away. Another example would be airline tickets. The processing could provide pricing trends for flights by airline and itineraries.

Various related processing may be performed, in addition to the features above. The invention is described above in the context of "credit cards" and monitoring credit card traffic, for example. However, the processing of the invention may also relate to (and use) various other transaction types, such as debit card transactions and stored value card transactions, for example.

FIG. 1 is a diagram showing high level aspects, in accordance with embodiments of the invention.

In particular, FIG. 1 illustrates the data/information that is utilized in processing a request for information from a customer. As shown, the processing 10 may utilize real time merchant transaction data 11 and/or historical merchant transaction data 12. The merchant transaction data and/or historical merchant transaction data may be in the form of raw data, i.e., unprocessed data. As shown, such real time and/or historical data is processed so as to yield working data 14, i.e., data that has been transformed, or in some other way manipulated, so as to result in a useful parameter. For example, "frequency" is working merchant transaction data. All of the real time merchant transaction data 11, the historical merchant transaction data 12, and the working merchant transaction data 14 may be used in the processing 10 of FIG. 1.

As shown, the request 16 from the customer drives the processing 10 of FIG. 1. Accordingly, the request 16, as well as the parameters provided with the request, are utilized in the processing of FIG. 1. In addition, the processing 10 of FIG. 1 uses the requesting customer's profile 18.

As a result of the processing 10, a response 20 to the requesting customer's request for information is generated. A wide variety of features and further details are described below.

Figure 2:
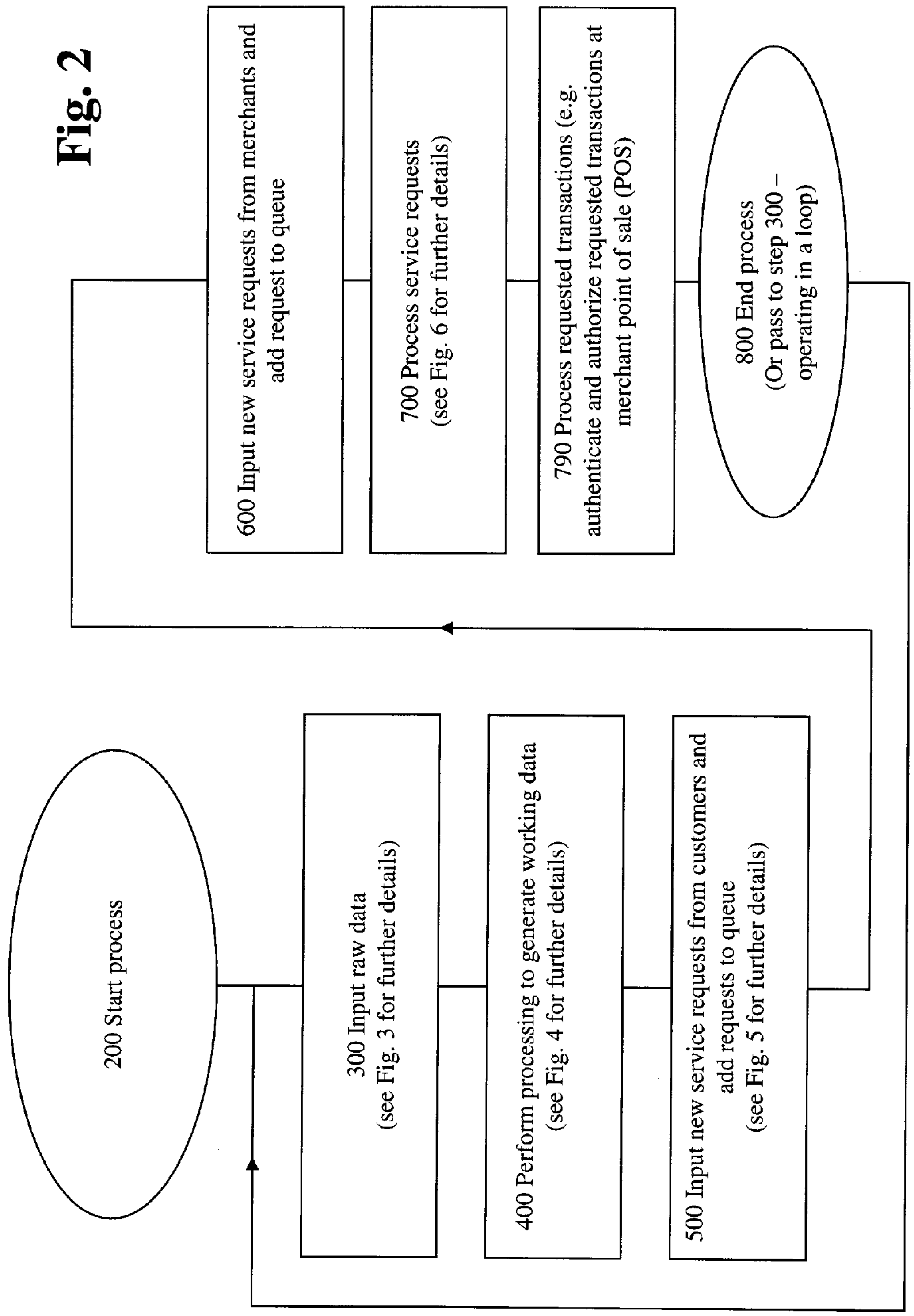
FIG. 2 is a flowchart showing further high level processing in accordance with one embodiment of the invention.

FIG. 2 is a flowchart showing a further high level process in accordance with one embodiment of the invention. As shown, the process starts in step 200, and passes to step 300. In step 300, raw data is input. This input of data may be performed on an ongoing basis. Then, the process passes to step 400.

In step 400, processing is performed on the input data to generate working data. That is, the raw data that is obtained may be combined with earlier data, i.e., historical data, and various mathematical processes may be applied to the data.

Such processes might include the generation of frequency data, as described below. After step 400, the process passes to step 500.

In step 500, the process inputs new service requests and adds such input service requests to queue. Then, in step 700, the processing is performed to satisfy those service requests. Then, the process passes to step 790. Step 790 reflects that the processing may include processing a requested transaction. Thus, an entity that performs the various customer service oriented informational requests, as described herein, may well also process a requested transaction. In particular, such entity might be an authentication entity that authenticates and authorizes a requested transaction at a merchant point of sale (POS).

After step 790 of FIG. 2, the process passes to step 800. In step 800, the process ends. Alternatively, it is appreciated that the processing of FIG. 2 may (at step 800) return to step 300 of FIG. 2. That is, in accordance with one embodiment of the invention, the processing of FIG. 2 may operate in an ongoing loop.

Figure 3:
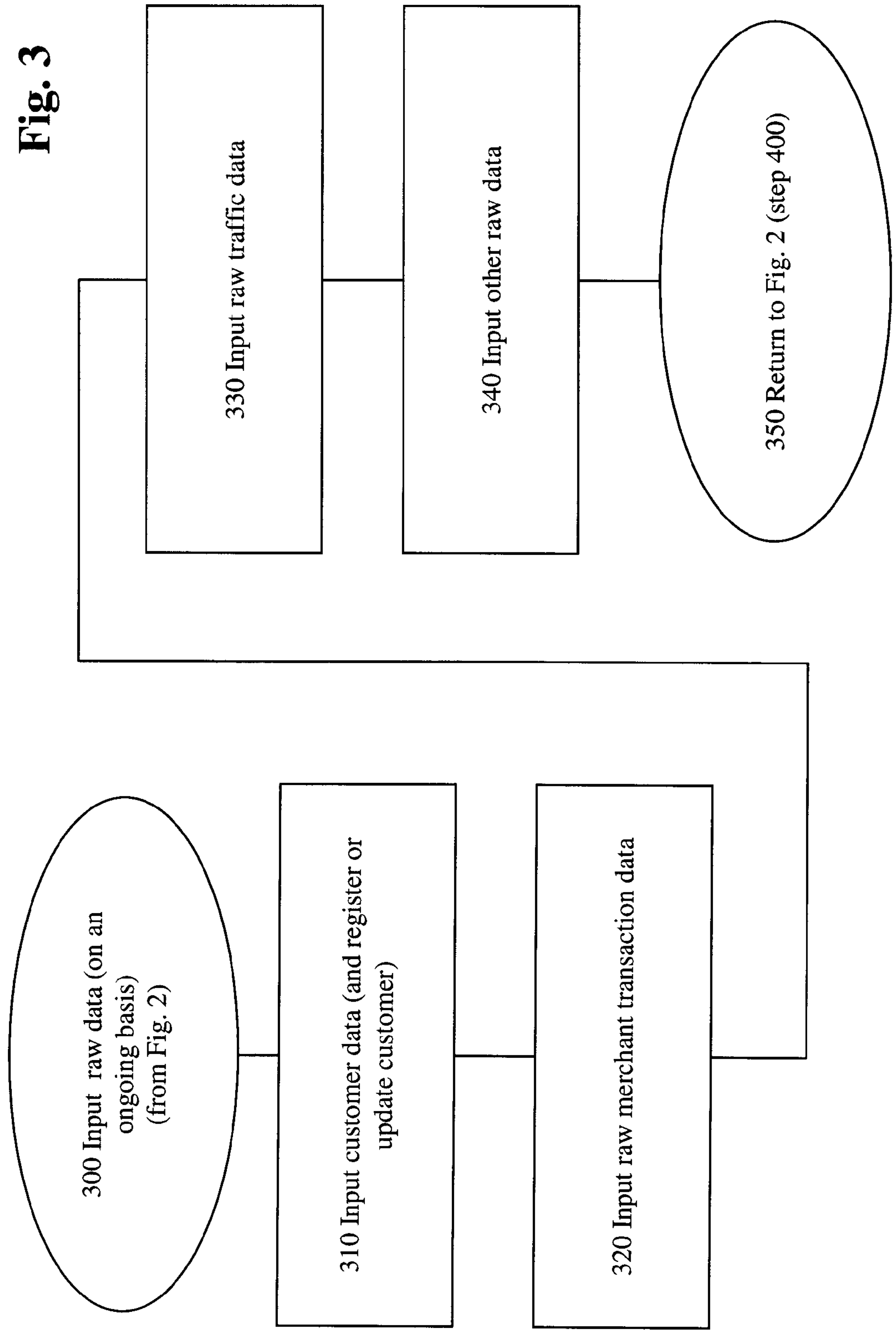
FIG. 3 is a flowchart showing further details of the input of raw data of FIG. 2, in accordance with one embodiment of the invention.

FIG. 3 is a flowchart showing further details of the input of raw data of FIG. 2, in accordance with one embodiment of the invention. As shown, the process of FIG. 3 starts in step 300, and passes to step 310. In step 310, the process inputs customer data. This might include the input of new (or updated data) from an existing customer. Alternatively, this processing might include the input of data from a new customer, e.g. the registering of a new customer. As shown in FIG. 1, the data input in step 310 constitutes static profile data, and is generally constant for a particular customer. Such static profile data might include the customer's home location, income, work location, education, employment type, spend activity, hobbies, sports and other parameters of the customer. After step 310, the process passes to step 320.

In step 320, the process inputs the raw merchant transaction data from merchants. This data may include the merchant identification information, type of purchase, and time of purchase, for example. Such data might include the number and type of purchases in a particular time window, i.e., if reporting is performed in a batch manner, the data may be input in an aggregated manner over a particular window of time.

After step 320, the process passes to step 330. In step 330, the process inputs raw traffic data. Such data might include the location of particular traffic input, the flow of traffic, the magnitude of traffic, and the type of traffic, for example. The type of traffic may include whether the traffic is refunds, the size of the transactions processed, and the magnitude of the transactions, for example. In particular information regarding refund traffic at a particular store would be helpful/needed if the customer was in need of securing a refund at the particular store.

Then, in step 340, the process inputs any other raw data. Such other data, as also discussed elsewhere herein, may include construction data (e.g. road construction data and store construction data), camera data, traffic data, sales data, time data, historical data, checkout line length related data, and cashiers open related data. Indeed, any of the data described herein may include historical data and/or real time data.

After step 340, the process passes to step 350. In step 350, the process returns to FIG. 2 and step 400.

FIG. 4 is a flowchart showing further details of the processing to generate working data, in accordance with one embodiment of the invention. To explain, FIG. 4 reflects processing in which raw data and/or historical data (historical data meaning data that was previously collected) is manipulated to generate useful information. That is raw merchant transaction data is processed with historical merchant transaction data to generate working merchant transaction data (MTD).

The processing of step 410 may include, for example, the generation of working frequency data for a target window. Such processing might use both historical and real time data. In accordance with one embodiment of the invention, the frequency data may include the number of transactions that occurred in a merchant's store in a particular period of time. The data might be as granular as possible or as desired, i.e., meaning that the data might reflect the frequency of purchases at a particular merchant, frequency of a particular type of purchase at a merchant, or frequency in a particular department of a merchant, for example. Processing to generate the frequency data may use varying degrees of historical data and real time data. For example, generation of frequency data may use only historical data. Such historical data might include the number of sales that occurred at store X last year on a particular day. Alternatively, generation of frequency data may use only real time data. That is, how many sales has occurred at store X in the last 10 minutes. Further, embodiments of the invention might use both historical and real time data. For example, historical data might reflect that on this day last year, the frequency of sales increased by 25% between 6 pm and 7 pm. Accordingly, such data might be used in conjunction with real time data. For example, if real time data reflects that current sales frequency is $2,000 per minute at 6 pm, then sales may be anticipated to increase to $2,500/minute in the next hour. Various other adjustments may be made to working merchant transaction based on a variety of parameters, as described herein. For example, adjustments might be made if the particular store is under construction or the roads to the store are under construction, for example. Further, the state of the financial networks might be utilized in the various processing as described herein, including the traffic on the financial networks, whether there are any financial networks down or under construction, and/or other information regarding the state of processing over the financial networks.

Other types of working merchant transaction data may be generated. Such data might be based on historical data, real time data, or both. The further types of working merchant transaction data may include, for example:

frequency variance data;
volume data (historical based, real time based);
volume to area data (historical based, real time based);
normalization data parameters; and
customer purchase associative data.

Frequency variance data may be generated based on the change in frequency of sales over time. Accordingly, the increase of 25% from 6 pm to 7 pm constitutes a frequency variance parameter. The invention may also generate working volume data. Such data may reflect the volume of sales over a particular time period, for example. Relatedly, the systems and methods of embodiments may generate working volume-area data. This is volume data, modified by the area in which such volume of sales takes place.

The invention may also provide working merchant transaction data including "normalization data parameters," as described herein. Such normalization data parameters may be generated and used to compare new information (or a new situation) with old information (or an old situation). Such features are described further below. The normalization data parameters provide for more effective use of information by customers.

For example, regarding normalization data parameters, a customer might be advised that the frequency of sales (based on current observed credit card activity aggregated with historical data) is 100 transactions an hour. However, if the customer does not know the particulars of the store, such "100 transactions an hour" information may have limited meaning. However, in accordance with one embodiment of the invention, the new information is compared, i.e., normalized with information that has meaning to the customer.

For example, frequency data from a store that a customer has not shopped at might be normalized with frequency data from a store that the customer has shopped at. Such normalization includes a normalization factor. In this example, the normalization factor is the area (square footage) of the stores. Thus, if the customer has meaning for a frequency value at a store that customer shops, and is presented with a normalized frequency value for a store not shopped, then the customer can associate much more meaning to the information.

Normalization processing, as performed in the systems and methods of embodiments, may take on a variety of forms. As used herein, "normalization" means the comparison through some calculation of two parameters (or other information) using a normalization factor. Generally, normalization processing includes gaining insight from a lesser known parameter via comparison, via the normalization factor, with a better known parameter.

In particular, normalization as described herein may take on the form of color coding (or in some other manner coding) the results of the processing for presentment to the customer. For example, a color coding scheme might be used in which green indicates a customer is anticipated to be able to check out in under 5 minutes, yellow means an anticipated check out in 5-15 minutes, red means an anticipated check out in 15-30 minutes, and dark red means an anticipated check out in 30 minutes or more. It is or course appreciated that any suitable color scheme might be used. Alternatively, or in addition, any other suitable scheme might be used to convey the information generated by the systems and methods of embodiments to the customer, such as graphical bar graphs, varying sized characters, varying sized circles, varying sized images, a clock like representation, a timeline, and/or other visual or graphical representations of the information generated. Such information might also be presented in other formats, such as an audio format in which the information is presented to the customer in some audio or audio/visual manner, for example. Indeed, the systems and methods of embodiments might be integrated with a vehicle's multi-media systems so as to present the information (generated by systems and methods of embodiments) to the customer using the vehicle's media systems.

With further reference to step 410 of FIG. 4, further working data that might be generated may include "customer-purchase associative data" such data is generated based on an association between customers and purchases made by the customers. In accordance with one example, such customer-purchase associative data may simply include an aggregation of purchases made by a particular customer, such as customer x purchased (in a month) $200 at grocery store 1, $270 at grocery store 2, and $350 at grocery store 3. As described below, aggregation of customer activities (in conjunction with the profiles of such customers) may be used in a wide variety of processing.

In the processing of FIG. 4, and steps 410, 420 and 430, raw merchant transaction data (i.e., data input directly from merchants) is manipulated so as to generate working merchant transaction data. In accordance with various embodiments of the invention, FIG. 4 represents both processing that is performed in advance of processing a particular customer request, as well as such processing performed for a particular customer request, or a combination of the two. For example, anticipated average frequency data for a particular merchant might be computed for every hour, and upon a customer requesting anticipated frequency in a particular hour, the system outputs the anticipated average frequency. On the other hand, the processing (or a part of) might indeed be performed in response to a customer request. For example, as described below, a customer might designate a particular time at a particular merchant, and in response, the processing utilizes a window of data around the customer given time, and calculates the anticipated average frequency in that window. Other variations of such processing re possible.

Returning to FIG. 4, after step 410, the process passes to step 420. In step 420, another type of raw data is processed to generate working data. That is, raw traffic data is processed to generate working traffic data. In accordance with one embodiment of the invention, such processing might include comparing observed traffic volume, along a particular route with previously observed traffic volumes, in conjunction with associating the previously observed traffic volumes with speed criteria, of some nature.

After the processing of step 420, the process passes to step 430 of FIG. 4. Step 430 reflects that various other data may be used in the processing, in addition to the merchant transaction data and the traffic data as described above. For example, other types of data might include weather data, merchant construction data (e.g. when a store is under construction), parking lot capacity data, camera data, and or other data as described herein. The other raw data of step 430 may be processed with historical data to generate working data.

After step 430, the process passes to step 440. In step 440, the process returns to step 500 of FIG. 2.

FIG. 5 is a flowchart showing further details of the "input new service requests and add request to queue" processing of FIG. 2, in accordance with one embodiment of the invention.

The processing of FIG. 5 relates to the input of requests for information from a customer or a merchant, for example. In accordance with some embodiments of the invention, such requests are placed into queue and processed at some later time. Such queue processing may be based on a FIFO (first in first out) approach. There may be different queues for different type requests. The time that a particular request spends in queue may vary from seconds (or less) to minutes to hours, i.e., depending on the volume of requests, system capabilities, the nature of the request, and related items.

FIG. 5 shows the different requests being input in a serial manner. However, the various requests may instead be input in a parallel manner, or indeed input independently of each other.

As shown in FIG. 5, the process starts in step 500, and passes to step 510.

In step 510, the process inputs a "customers like us" activities request. This request provides information (regarding a target activity) to a customer regarding activities of other customers, who are similarly situated. The particular parameter (i.e., a "similarity parameter") upon which the similarity is based may be selected by the customer and/or varied. The similarity parameters may be ranked by the customer, i.e., so as to designate which similarity parameter is more important, and to weight that parameter accordingly.

Also, limiting parameters, i.e., constraints, may be selected by the customer and/or input by the processing in some manner.

For example, a customer may request information, based on income, regarding what stores other customers in their area shop. Accordingly, in this example, the similarity parameter is income, and the target parameter is stores. A variety of constraints may be imposed. The constraints might include a defined area within the customer's zip code, a particular type of store, tax consequences of shopping in a particular area (e.g. a particular state), preference information of shopping in a particular area, a particular store, a particular time of day or day, or other parameters as described herein, for example. In general, the various parameters as used in the systems and methods of embodiments (including constraints and preferences, for example) may be imposed by the customer or imposed by the system in some automated manner. For example, particular observed parameters of the situation and/or attributes of the customer might result in the automated imposition of constraints and/or preferences.

Further, the request of step 510 may include a plurality of similarity parameters. As noted above, the parameters may be ranked in some manner, such as assigning weights to the parameters. Accordingly, similarity parameters might include zip (or other location criteria), education, work type (i.e., what type of work customers do), spend activity (i.e., how much customers spend on a particular activity, product information, and merchant information, for example. Various further features of such processing are described below.

As shown in FIG. 5, after step 510, the process passes to step 520. Step 520 reflects another type of request. That is, in step 520, the process inputs a customer request for a product search. The request may include various particulars, such as the product or type of product that is requested, an area in which the customer wishes to purchase the product, a store the customer wishes to purchase from, a type of store (e.g. on-line stores); a price range and other constraints. Further details are described below. After step 520 of FIG. 5, the process passes to step 530.

Step 530 reflects another type of request. That is, in step 530, the process inputs a request for a credit card traffic alert report. In this request, the customer indicates a type of product that the customer wishes to purchase, and the processing advises the client regarding where the customer should purchase the product, i.e., which is the best merchant to make the in-store purchase. The input received with the request, may include various particulars including target merchants, consideration parameters (which may be weighed vis-à-vis each other), time parameters, desired output parameters (i.e., the manner in which the customer receives responsive information, as well as other data. Consideration parameters, as further described below, relate to what competing parameters are weighed vis-à-vis each other. For example, consideration parameters may include stores, distance, traffic, and weather, for example. The consideration parameters may be weighted by the customer (via selection in conjunction with doing the particular request or as stored in the customer's profile). Further, the magnitude of the consideration parameters bear weight in the analysis. After step 530 of FIG. 5, the process passes to step 570. In step 570, the process inputs requests from merchants. Further details of step 570 are described below. After step 570, the process passes to step 580. In step 580, the various requests (of steps 510, 520, 530 and 570) are added into queue. In accordance with one embodiment of the invention, the requests may be added into queue with appropriate tags and/or identifying indicia, so as to coordinate further processing of the various requests.

After step 580, the process passes to step 590. In step 590, the process returns to FIG. 2, and specifically passes to step 700 of FIG. 2.

Figure 6:
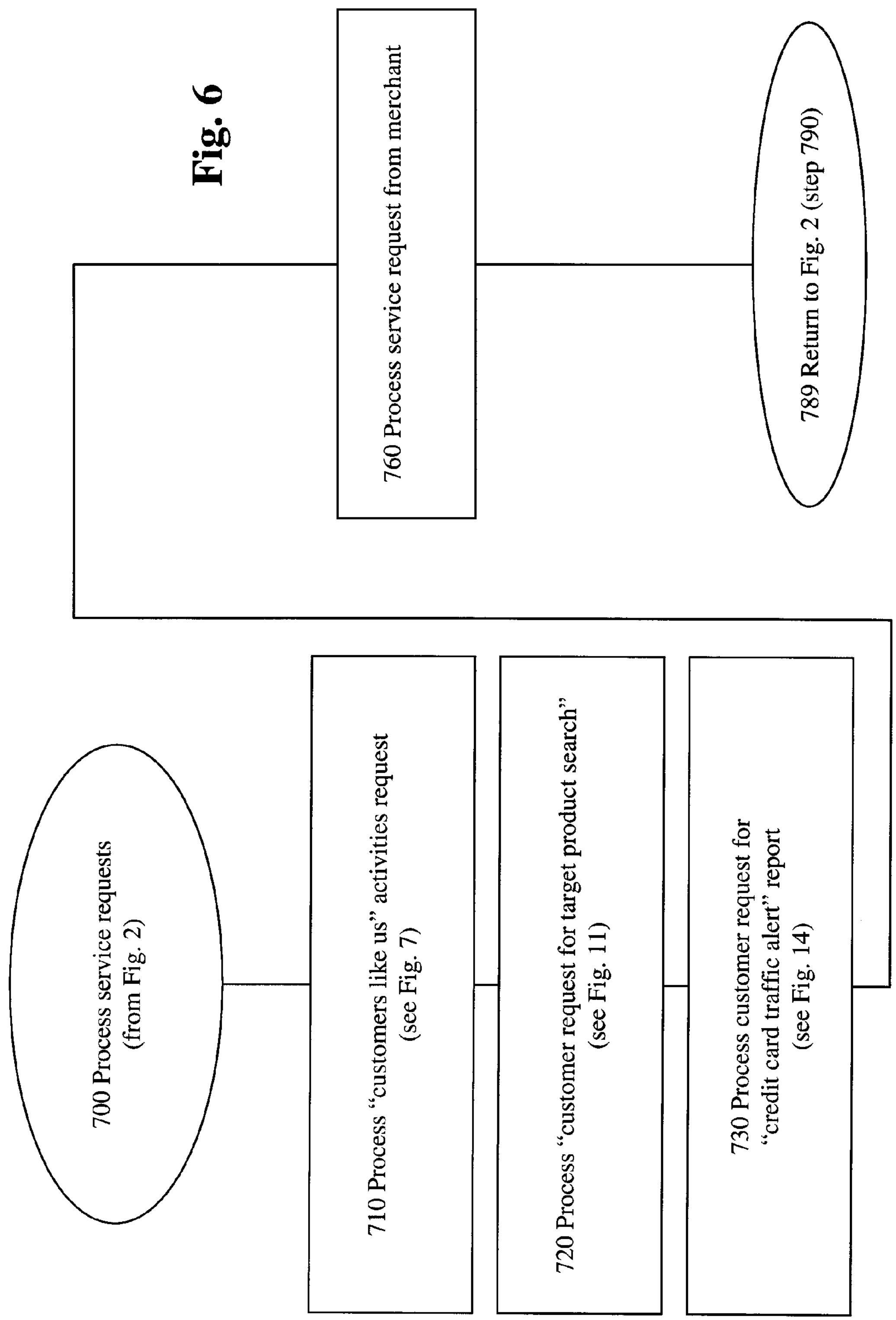
FIG. 6 is a flowchart showing further details of the "process service requests" step of FIG. 2, in accordance with one embodiment of the invention.

FIG. 6 is a flowchart showing further details of the "process service requests" step of FIG. 2, in accordance with one embodiment of the invention. Various details of the steps of FIG. 6 are described in detail below.

In step 710, the method processes "customers like us" activities request. Further details of such processing are shown in FIG. 7.

In step 720, the method processes "customer request for target product search." Further details of such processing are shown in FIG. 9.

In step 730, the method processes customer request for "credit card traffic alert" report." Further details of such processing are shown in FIG. 11.

In step 760, the method processes service requests from merchants.

After step 760 of FIG. 6, the process passes to step 789. In step 789, the process returns to FIG. 2 and step 790.

FIG. 7 is a flowchart showing further details of the processing of a "customers like us" activities request of FIG. 6, in accordance with one embodiment of the invention. The process starts in step 711 wherein the request is retrieved from queue, including the various parameters of the request. Parameters of the request that may be retrieved include any target activity; any similarity parameter(s), and ranking if there are multiple similarity parameters; and any constraints that are to be imposed, for example. The constraint might be either selected by customer or imposed automatically by the system. For example, the constraints might be automatically imposed by the system based on the customer's profile.

After step 711 of FIG. 7, the process passes to step 713. In step 713, the process generates the requesting customer's dynamic profile data (based on customer profile and data unique to the particular request). Then, the process passes to step 910.

In step 910, the processing determines the nature of the data to use, i.e., whether to use real time data, historical data, or some combination. The selection of the particular data to use may be based on the customer's profile, including both static and dynamic components. Further details of step 910 are described below. After step 910, the process passes to step 714.

In step 714, the data to be used (i.e., the data that was identified in step 910) is retrieved from the database or databases in which such data is housed. Then, the process passes to step 715.

In step 715, the process determines who the similarly situated customers are. Such comparison, in accordance with one embodiment of the invention, is performed based on the data that was retrieved in step 714 vis-à-vis the customer's profile. The comparison is performed based on the similarity parameters, which were either selected by the customer or provided by the processing in some automated manner. The similarity parameter are the parameters upon which the comparison will be based.

FIG. 8 is a diagram showing aspects of the processing of FIG. 7, in accordance with one embodiment of the invention. As shown, the similarity parameters are income, location and spending. Thus, these are the parameters upon which the requesting customer will be compared vis-à-vis other customers in the database, i.e., to determine which of the other customers in the database are similar (to the requesting customer). The comparison value of FIG. 8 may be generated in any suitable manner. For example, a database customer (in the database) within 10% of the income of the requesting customer's income might be assigned a top value of 10 (e.g. the requesting customer's income is $100,000 and the database customer's income is $108,000. A second database customer might lie within the range of 10%-20% of the income of the requesting customer's income, i.e., if the requesting customer's income is the $100,000, a database customer's income of $80,000-$90,000 or $110,000-$120,000 would result in the database customer being assigned a comparison value of 9. In this example, a database customer laying within 20%-30% would then be assigned a comparison value of 8, and so forth.

As reflected in FIG. 8, the processing may also include, for each similarity parameter, a customer similarity parameter preference. The customer similarity parameter preference may be selected by the requesting customer, or in some manner generated by the processing, e.g. based on other criteria. The customer similarity parameter preference reflects, in accordance with one embodiment of the invention, the value that the requesting customer places on a particular similarity parameter. The customer similarity parameter preference might be implemented as a value of anywhere from 1-10, with a 10 indicating that similarity parameter is very important to the customer, and with a 1 indicating that the similarity parameter is least important to the requesting customer. Thus, for example, as shown in FIG. 8, the "location" similarity parameter is assigned a value of "9" and thus is more important to the requesting customer vis-à-vis the "spending" similarity parameter that is assigned a "6".

In accordance with one embodiment of the invention and as shown in FIG. 8, the comparison value of the similarity parameter and the customer similarity parameter preference might be simply multiplied so as to generate a calculated rank value (for a particular database customer). As shown in FIG. 8, the calculated rank value of database customer N+1 is 153, and the calculated rank value of database customer N+2 is 157. Thus, database customer N+2 is ranked higher than database customer N+1.

In lieu of (or in combination with) the processing described above with regard to determining what customers are similar to what other customers, other mathematical processing might be performed (based on suitable attributes) to determine what customers are similar to a given customer. For example, in accordance with one embodiment of the invention, the customers might belong to groups, i.e., classes or categories. Thus, the determination of a similar customer (of a requesting customer) would include determining what other customers are in the same group as the requesting customer. Further, a customer and/or a particular card or account of the customer might be associated with different groups, i.e., multiple groups. Such would be the case where there are multiple users of a particular card/account. Further, customers might be included in a particular group based on attributes associated with that customer, e.g. based on the customer profile. Alternatively, a customer might opt into a particular group, i.e., request to be placed into a particular group. This might be the case where a customer is about ready to transition into a different group, e.g. college graduates. The customer (while not currently in a particular group) might want to secure information about the particular group. The customer selected opting into a group allows the customer such ability, i.e., to experience attributes of other groups while not actually belonging to such other group.

Further, it is appreciated that a particular class, i.e. a particular group, that a customer opts into, is not necessarily the group/class that their transaction activity (or other attributes) are placed into. That is, distinct from the group that the customer chooses, the bank (or other entity maintaining the system of the invention) may determine what group the customer is in, and allocate information regarding that customer accordingly.

Depending on the particular processing being performed, the processing may use a group that the customer has opted into, or a group that the financial entity has determined that the customer belongs to. For example, if a customer effects a transaction, then that data might be placed based on the group that the financial entity has assigned. On the other hand, if the customer is requesting information about other similar customers, then the group that the customer opted into might be used. If the particular card or account is associated with multiple categories, then particular input (e.g. attributes) may be used to determine which group to utilize in the processing. For example, location attributes (of a particular transaction) might be used and/or a selection by the particular customer that a certain group should be used in conjunction with the particular processing being performed.

Further to the above description, FIG. 9 is a flowchart showing details of the processing of the determination of the similarly situated customers (step 715) of FIG. 7, in accordance with one embodiment of the invention.

As shown in FIG. 9, the processing starts in step 715-1. In such step, the process runs a comparison for each similarity parameter (requesting customer vis-à-vis database customer) to determine "comparison value". Then, in step 715-2, the process weighs the comparison value with the "customer similarity parameter preference" (e.g. the process multiplies the comparison value by the customer similarity parameter preference) to generate a "calculated rank value." However, it is appreciated that such weighing may be performed in a different mathematical manner, as desired. After step 715-2 of FIG. 9, the process passes to step 715-3.

In step 715-3, the process adds the calculated rank values of each database customer. In accordance with one embodiment and example of the invention, FIG. 8 shows a database customer N+1 having a total of 153, and a database customer N+2 having a total of 157.

Then, in step 715-4, the process ranks the database customers based on their total calculated rank value. Thus, for example, database customer N+2 is ranked higher than database customer N+1. Then, the process passes to step 715-5.

In step 715-5, the process imposes any applicable constraints. That is, such step 715-5 reflects that in the processing constraints may be imposed. For example, one constraint might be that customer's from a particular location, e.g. a particular zip, should not be included in the results.

Then, in step 715-6, the process outputs the listing of similarly situated customers, i.e., outputs the results of the processing. After step 715-6, the process passes to step 715-7. In step 715-7, the process returns to FIG. 7 and step 716.

Returning now to the higher level processing of FIG. 7, in step 716 of FIG. 7, the process determines what the activities of the identified "similarly situated customers" are. That is, "who" such customers are was determined in step 715. Now, in step 716, it is determined what those identified customers do, i.e., what activities are such identified customers engaged in. This processing may be performed using what may be characterized as "customer activity associative data." Such customer activity associative data may be in the form of a mapping of customers to activities those customers are engaged in, in accordance with one embodiment of the invention. After step 716, the process passes to step 717.

In step 717, the process imposes any further constraints that are applicable. For example, if a target activity was provided by the requesting customer, the processing will constrain the results to only reflect such target activity.

After step 717 of FIG. 7, the process passes to step 718. In step 718, the process generates the results of the processing. in accordance with one embodiment of the invention, the results of the processing might be in the form of a report that lists who the similarly situated customers are (in some appropriate aggregated manner) and sets out what activities those similarly situated customers engage in. If a particular target activity was specified by the requesting customer, the results might be in the form of a report that lists who the similarly situated customers are (in some appropriate aggregated manner) and sets out what activities (in the target activity) those customers engage in. For example, if climbing was the target activity the report might specify the particular merchants at which the similarly situated customers shop for gear, as well as the particular venues at which the similarly situated customers climb. As a result, the requesting customer would be in possession of the knowledge that if they shopped at a top ranked store (per the results) and climbed at the top ranked venue (per the results), then that requesting customer would have the best chance of associating with similarly situated customers.

In step 719 of FIG. 7, the process returns to FIG. 6 (step 720).

As described above, the processing of FIG. 7 utilizes "similarity parameters." The similarity parameters are the parameters upon which the requesting customer is compared with other customers in the database (i.e., the database customers) so as to determine who the similarly situated customers indeed are. The similarity parameters might include a variety of parameters including zip (or other location criteria), education, work type (i.e., what type of work customers do), spend activity (i.e., how much customers spend on a particular activity, product information, and merchant information, for example.

Figure 10:
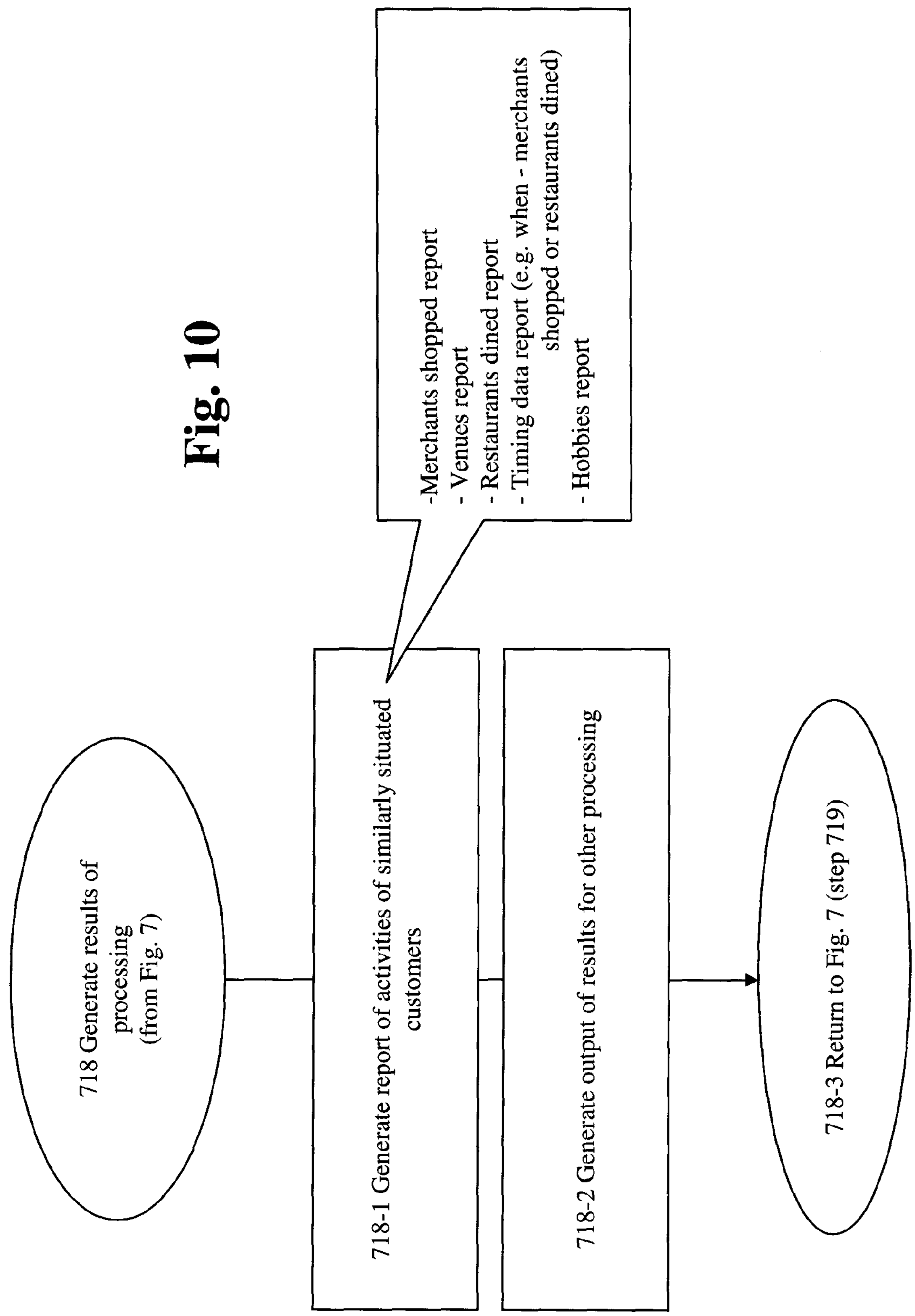
FIG. 10 is a flowchart showing further details of the generate results of processing of FIG. 7, in accordance with one embodiment of the invention.

FIG. 10 is a flowchart showing further details of the generate results of processing step 718 of FIG. 7, in accordance with one embodiment of the invention. The process of FIG. 10 starts in step 718, and passes to step 718-1.

In step 718-1, the process generates a report of activities of similarly situated customers, for example, as described above. In further illustration, the report might include a merchants shopped report, a restaurants dined report, and a hobbies report.

Further, in accordance with one embodiment of the invention, the report might include timing information, i.e., a timing report or component. Such a timing report might include information about when similarly situated customers shopped at a particular merchant, dined at a particular restaurant, or engaged in a particular venue, for example.

After step 718-1 of FIG. 10, the process passes to step 718-2. In step 718-2, the process generates an output of results for other processing. In other words, in accordance with one embodiment of the invention, the processing/results of FIG. 7 may be used in subsequent processing. For example, in targeting a particular product, such processing may include a "similarly situated customers" component, as described further below.

After step 718-2 of FIG. 10, the process passes to step 718-3. in step 718-3, the process returns to FIG. 7 and step 719.

FIG. 11 is a flowchart showing further details of the step 720 "process customer request for target product search" of FIG. 6, in accordance with one embodiment of the invention. As described above with reference to FIG. 6, the input of such requests includes particulars of the request. These particulars may include the target product, customer zip, and a particular manufacturer, for example. Also, the processing of FIG. 11 may use the similarly situated customers processing of FIG. 7, as described above. That is, the similarly situated customers results might be a component in the target product search.

Accordingly, after the process of step 720 starts, the processing passes from step 720 to step 721. In step 721, the process retrieves information from the request, i.e., the information that was submitted by the requesting customer. Then, in step 722, the process retrieves the customer profile, and in particular the static profile data. Then, the process passes to step 723.

In step 723, the process generates the requesting customer's dynamic profile data. The dynamic profile data for the requesting customer, as described above, is the data that is particularly for the specific customer for the specific request. After step 723, the process passes to step 910.

In step 910, the process determines the nature of data to use, i.e., real time or historical data, based on customers profile. Details of such processing are described below with reference to FIG. 17.

Then, in step 724, the process retrieves the data that was identified in step 910. In step 725, based on the retrieved data, the process identifies the product sales data, either historical or real time data, related to target product.

Figure 12:
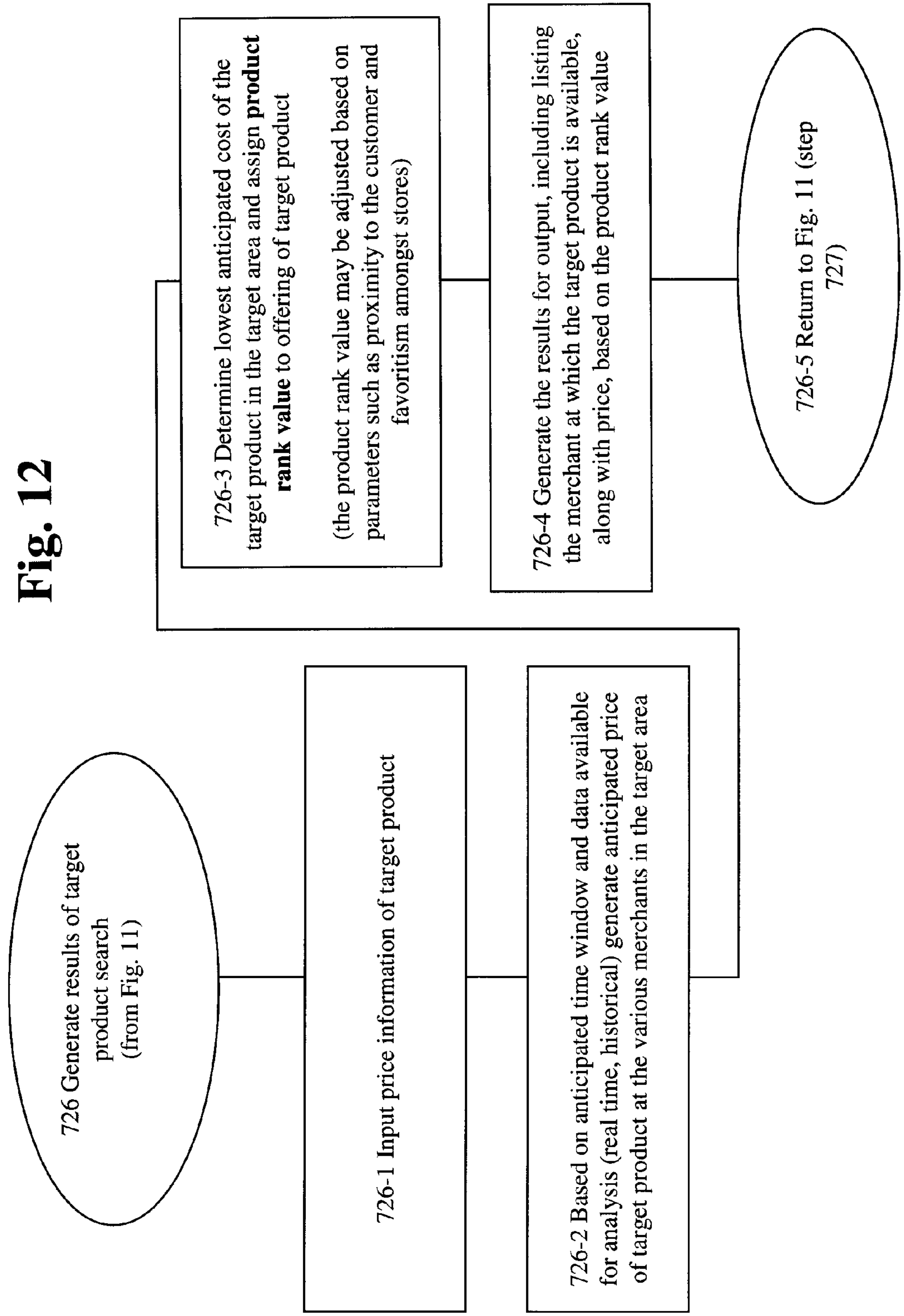
FIG. 12 is a flowchart showing further details of the generate results of target product search of FIG. 11, in accordance with one embodiment of the invention.

Then, the process passes to step 726. In step 726, the process generates the results of the product search. Further details of step 726 are described below with reference to FIG. 12.

Then, as shown in FIG. 11, the process passes to step 727. In step 727, the results are output, such as to the requesting customer or a different process.

Then, in step 728, the process returns to FIG. 6 and step 730.

As noted above, FIG. 12 is a flowchart showing further details of the generate results of target product search (step 726) of FIG. 11, in accordance with one embodiment of the invention.

The process starts in step 726, and passes to 726-1. In step 726-1, the process inputs price information of the target product. Such price information may include a variety of retrieved information, such as price for the item at a particular merchant, location of the merchant, price fluctuation information (regarding the variance of price over a period of time), and related data. It is appreciated that the nature of the target product may vary from request to request. For example, the request might specify that the target product is a printer in a particular price range. Alternatively, the request might specify the target product more specifically, as is a Then, in step 726-2, based on the anticipated time window (i.e., the time window that the requesting customer has indicted they want to buy the item) and the data used for the analysis (real time or historical), the process generates an anticipated price of the target product at the various merchants in the target area. Then, in accordance with one embodiment of the invention, the process passes to step 726-3.

In step 726-3, the process determines the lowest anticipated cost of the target product in the target area and assign product rank value to the particular offering of the target product. The product rank value may be adjusted based on parameters such as proximity to the customer and favoritism amongst stores, for example. In accordance with one embodiment of the invention, such processing may be similar to that described above, and shown in FIG. 8.

After step 726-3, the process passes to step 726-4. In step 726-4, the process generates the results for output, including listing the merchant at which the target product is available, along with price, based on the product rank value. The product rank value might also be provided, as well as other information, useful to the requesting customer in their decision as to where to purchase the target product, such as distance from the requesting customer home zip to the merchant at which the identified product is offered.

FIG. 13 is a table showing illustrative results, in accordance with one embodiment of the invention. The table of FIG. 13 shows the results may include name of the product identified, price of the product identified (i.e., the product in a particular store that satisfies the target product request), the name of the merchant where the product identified is sold (as well as information about the merchant, such as a telephone number), and the distance from the customer's home zip code to the merchant, for example. As shown, the results may also include the product rank value. The ordering as set forth in FIG. 13 is based on such product rank value. By providing the product rank value in the results, such information may be helpful to the requesting customer, e.g. in conveying to the customer the magnitude of difference between the desirability of where to purchase the product.

In accordance with one aspect of the invention, the first ranked target product as shown in FIG. 13 is actually more expensive than the second ranked product. However, the first ranked product is much closer, e.g. 5 miles to the requesting customer vis-à-vis the second ranked product. Accordingly, the first ranked product received a higher product rank value. Note that in another example, the customer may have given the "distance" parameter a low preference value, i.e., meaning that distance differential between the products mattered to a limited extent. In such case, the second ranked product of FIG. 13 might be elevated to be first ranked, i.e., in that the weighting accorded to the "distance" parameter would be less, such that the price would control to a greater degree.

Returning now to FIG. 12, after step 726-4 of FIG. 12, the process passes to step 726-5. In step 726-5, the process returns to FIG. 11, and in particular step 727.

FIG. 14 is a flowchart showing further details of the step 730 "process customer request for 'credit card traffic alert' report" of FIG. 6, in accordance with one embodiment of the invention. The process starts in step 730, and passes to step 731.

In step 731, the process retrieves the request (with the various request data) from queue. As described above, the request may include the target merchants (i.e., those merchants at which the requesting customer wants to shop), favoritism values (i.e., how to weight different competing parameters), time parameters, desired output parameters, and other information.

After step 731, the process passes to step 732. In step 732, as described herein, the process generates the requesting customer's dynamic profile data for the particular request. That is, the dynamic profile is data generated that is for the particular customer for the particular request. For example, any favoritism values provided by the requesting customer may be a part of the dynamic profile.

After step 732, the process passes to step 910. In step 910, the process determines the nature of the data to use (e.g. real time and/or historical data) based on customer particulars. Further details of such processing have been described above.

After step 910 of FIG. 14, the process passes to step 733. In step 733, the process retrieves the data that was identified in step 910 as the data to be utilized in the request. The retrieved data includes the listing of merchants that the requesting customer has indicated are targets, in accordance with one embodiment of the invention. In another embodiment, the list of merchants might be generated in some manner, i.e., such as through the processing of FIG. 11.

One the merchants in the data are identified in step 733, the process passes to step 734.

In step 734, the process processes the various merchants that have been identified, i.e., so as to determine a merchant rank values for each of the respective merchants. That is, in step 734, the first merchant identified is processed. Thereafter, the remaining merchants are processed. Further details of such processing are described below with reference to FIG. 15. After step 734 of FIG. 14, the process passes to step 735. Step 735 merely reflects decisioning as to whether there are any further merchants that should be processed in step 734. If yes, the processing loops back through step 734 until all the merchants have been processed.

Once the decisioning of step 735 determines that indeed all the merchants have been processed, the method passes to step 736.

In step 736, the processing determine the target order of merchants based on adjusted merchant rank value. That is, the processing determine which merchant has the highest adjusted merchant rank value (MRV) and assigns that merchant at first spot in order. Similarly, the processing orders the other merchants based on their respective adjusted MRV.

After step 736, the process passes to step 737. In step 737, the processing generates output to the customer's request based on the desired output parameters. That is, the processing generates the output in the manner/format that the customer and/or system has designated. Further details of step 373 are described below with reference to FIG. 16.

After step 737 of FIG. 14, the process passes to step 738. In step 738, the processing returns to FIG. 6 and step 760.

FIG. 15 is a flowchart showing further details of the processing of the merchants (step 734) of FIG. 14, in accordance with one embodiment of the invention. As shown in FIG. 15, the process starts in step 734 and passes to step 734-1.

In step 734-1, the process identifies the next merchant in the request data, and retrieves working frequency data, for the target window. In other words, the customer may have indicated that there target window to shop is between 10 and 11 am on a particular morning. Based on historical data, real time data, or both, the processing determines a frequency of credit card transactions at the particular merchant. Then, in step 734-2, the processing assigns a merchant rank value (for the particular merchant) based on the working frequency data. Generation of the working frequency data is described above.

In accordance with embodiments of the invention, it is appreciated that the granularity at which a merchant is viewed may vary (but may well be limited by the granularity of the data obtainable). Accordingly, the "merchant" of the processing of FIG. 15 may be in the form of a store. On the other hand, such merchant may indeed be broken down further, e.g. such as separate departments in the store. Thus, the systems and methods of embodiments may provide for congestion alerts (and other processing as described herein) even if the customer is shopping in only one store. That is, the invention may provide guidance as to what area or department in a particular store is experiencing high traffic/congestion. The "granularity" of the processing may vary in other ways, as desired, and based on the data that is available.

After step 734-2 of FIG. 15, the process passes to step 734-3. In step 734-3, the method performs processing to generate rank adjustment values (RAV) for the merchant. That is, in step 734-2, the particular merchant is assigned what might be characterized as a baseline "merchant rank value." In step 734-3, such baseline merchant rank value is adjusted based on a variety of parameters. In accordance with one embodiment of the invention, the processing may generate a rank adjustment value based on the favoritism value (the extreme case being that a particular merchant is will be placed first in the order, regardless of frequency of transaction, i.e., congestion, at the particular merchant. In other words, such favoritism value relates to a situation that the customer highly prefers to shop at a particular merchant first, regardless of the situation at that merchant. Such a case might be that the customer is concerned that she may need to attend to other unrelated tasks at some undetermined time, and just wants to be sure to get in one particular purchase.

In step 734-3, rank adjustment values may be generated based on other parameters, including to generate rank adjustment value based on customer location, store location, working traffic data, store close time, etc.; generate rank adjustment value based on working other data, and/or generate rank adjustment value based on "customers like us" data.

Once the rank adjustment values are all generated, in step 734, the processing aggregates the merchant rank value, i.e., the baseline value, with the rank adjustment values to determine an adjusted merchant rank value (adjusted MRV). It is then such adjusted merchant rank value that will then be used in the processing of step 736 (FIG. 14) as described above.

After step 734-3 of FIG. 15, the process passes to step 734-4. In step 734-4, the process return to FIG. 14 (step 735).

Figure 16:
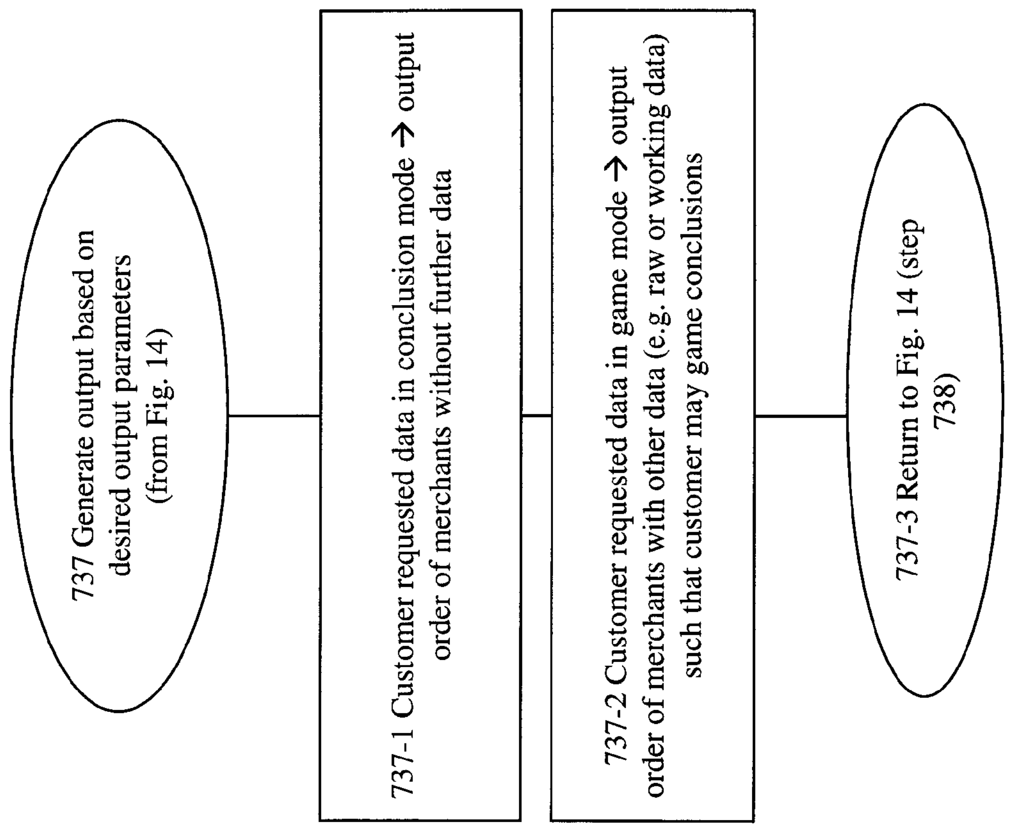
FIG. 16 is a flowchart showing further details of the generate output based on desired output parameters of FIG. 14, in accordance with one embodiment of the invention.

FIG. 16 is a flowchart showing further details of the generate output based on desired output parameters (step 737) of FIG. 14, in accordance with one embodiment of the invention. FIG. 16 generally reflects that the results may be generated and displayed to the requesting customer in a variety of manners.

Illustratively, in step 737-1, the customer had previously requested data in conclusion mode. Accordingly, the processing outputs a determined order of the merchants (to go to) without further data.

Alternatively, step 737-2 reflects that the customer requested data in game mode. In this mode, the customer may well be provided the order of merchants. However, the customer may also be provided other data, such as raw or other working data. With such further information, the requesting customer (and/or the accompanying family of the requesting customer) may try to analyze the data themselves. In this manner, a certain gaming component is added to the experience, which may be enjoyable by some customers.

After step 737-2 of FIG. 16, the process passes to step 737-3. In step 737-3, the process returns to FIG. 14 and step 738.

FIG. 17 is a flowchart showing further details of the "determine nature of data to use (real time, historical data) based on customer particulars" processing, in accordance with one embodiment of the invention. As described above, the processing of step 910 is utilized in various higher level processing.

As shown, the process starts in step 910, and passes to step 911. In step 911, the process retrieves customer static profile data, and based thereon, assigns a data rank value. Then, in step 912, the process retrieves the customer profile dynamic data and adjusts data rank value accordingly. For example, it might be the case that for a particular customer request, the data rank value should be increased, such that real time data may be used, and not only historical data.

Further, in step 913, the process determine if customer has manually added to their data rank value, and adjust data rank value accordingly. For example, the customer may have paid a fee (or subscribed to a program) via which the customer has increased their data rank value. After step 913, the process passes to step 914.

In step 914, the process determine if any further adjustments to the data rank value are needed, and them in step 915, determines the final value of data rank value.

Once the data rank value has been determined, the processing identifies the particular data (real time, or historical) based on data rank value, i.e., the particular data that will be used in the customer request. As described herein, both real time data and historical data may be used in the processing of the invention. As used herein, 'real time" and/or "real time data" means data that is reflective of, and secured from observation of, events that are currently happening. Data that is before real time data is characterized herein as historical data.

With further reference to FIG. 17, after step 916, the process passes to step 917. In step 917, the subprocess of FIG. 17 returns to the higher level processing.

In step 760 of FIG. 6 above, service requests from merchants are processed. It is appreciated that the various processing as described above vis-à-vis a customer, may also be utilized by a merchant. Merchants may utilize the systems and methods of embodiments in various ways. For example, a merchant might be provided information regarding how many customers were presented with their store as a possible target, but in the end decided not to shop at such store. Such could be accompanied with information regarding wait times (and other data) that was presented to the customer, i.e., the data that influenced the customer's decision, or data upon which the data that was presented to the customer was based. Merchants may use information regarding how many customers are inquiring about a certain product or a certain store, how many customers use a particular card, or how may customers of a certain class/category/group shop at their store, for example. In general, any of the information described herein may be presented to a merchant so as to be used by the merchant. Thus, for example, a merchant may use the information to determine how an increased wait time results in decreased customers in a store (and the resultant loss of business to the merchant). In response to such information, the merchant may make adjustments as desired or needed, such as adjusting marketing materials, adjusting store hours or location, adjusting staffing, and/or adjusting other parameters.

Further, as described herein, merchants might indeed supplement data that is used in the processing as described herein. For example, a merchant might provide an actual observed wait time at a particular store. This information might then be used with the processing as described herein. For example, such information from the merchant might be appropriately weighed (as desired) with data generated from the processing described herein.

Figure 18:
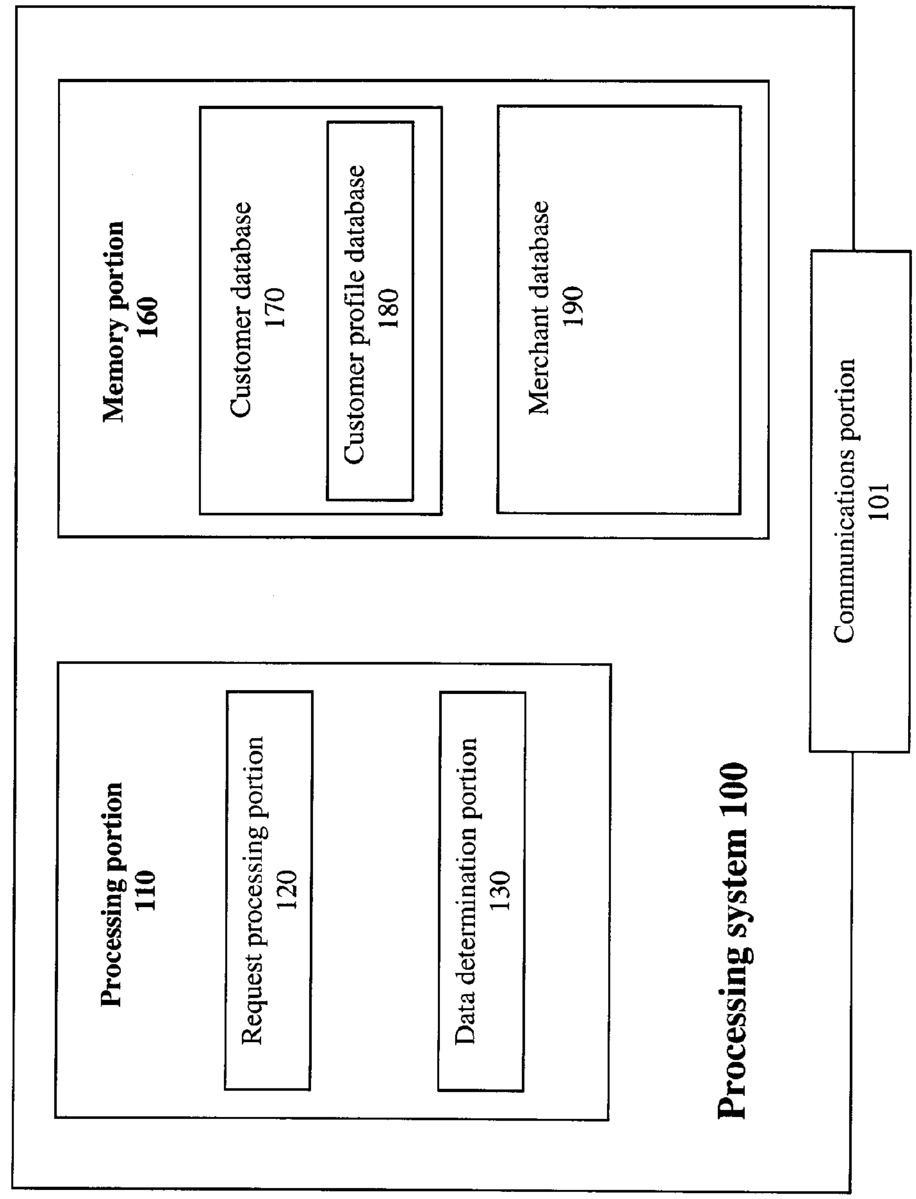
FIG. 18 is a block diagram of a processing system in accordance with one embodiment of the invention.

Various processing is described above. FIG. 18 is a block diagram of a processing system 100, in accordance with one embodiment of the invention, which may be used to effect the various processing described above.

As shown, the processing system 100 includes a processing portion 110 and a memory portion 160. The processing portion 110 performs the various processing as described above. The memory portion 160 stores the various data used in such processing (and generated from such processing), as described above.

The processing system 100 also includes a communications portion 101. The communications portion 101 provides for the various transfer of data as described above. For example, the communications portion 101 provides for the transfer of data between the processing system 100 vis-à-vis merchants and customers.

More specifically, the processing portion 110 includes the request processing portion 120 and the data determination portion 130. The request processing portion 120 is the portion of the processing portion 110 that handles the processing of the requests as described above. Other processing is handled by the processing portion 110 in general. The data determination portion 130 handles the determination, as described above and with reference to FIG. 17, of what data should be used in the processing. In particular, the data determination portion 130 determines whether real time or historical data or both should be used.

The memory portion 160 includes both the customer database 170 and the merchant database 190. The customer database 170 includes the various data relating to the customers. In particular, the customer database 170 includes the customer profile database 180. The customer profile database 180 includes the customer's profiles. The merchant database 190 retains the various data regarding merchants. In particular, the merchant database 190 stores merchant transaction data, including both real time and historical data.

Figure 19:
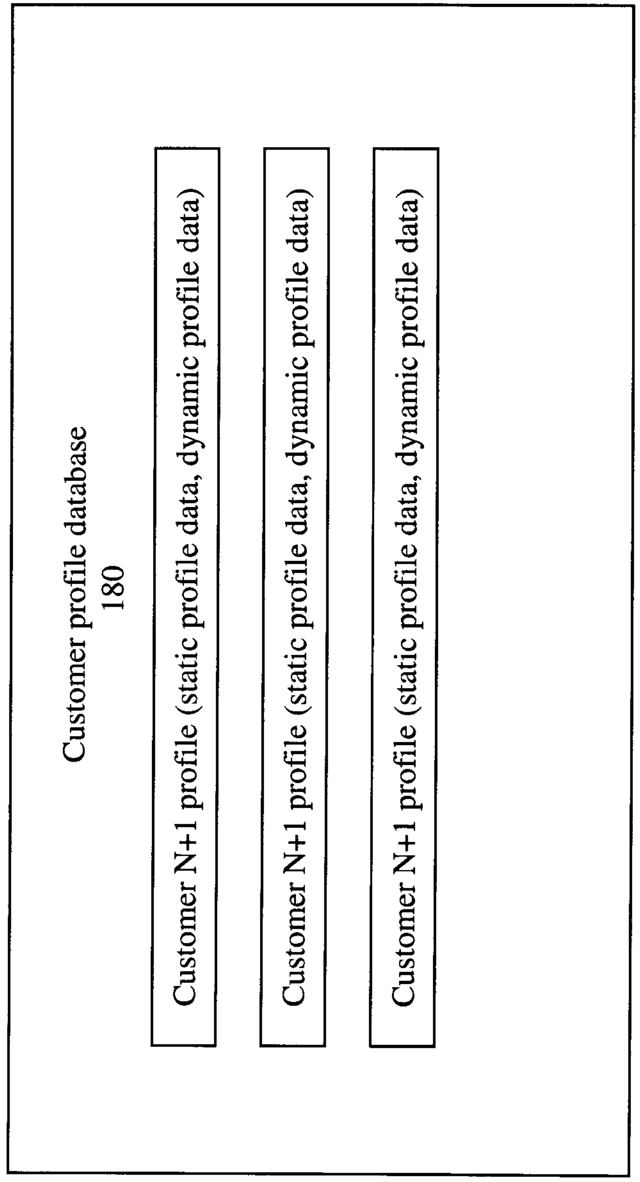
FIG. 19 is a block diagram showing further details of the customer profile database of FIG. 18, in accordance with one embodiment of the invention.

FIG. 19 is a block diagram showing further details of the customer profile database 180 of FIG. 18, in accordance with one embodiment of the invention. As shown in FIG. 19, and described in various detail above, the customer profiles, including both static profile data and dynamic profile data, are stored in the customer profile database 180.

Figure 20:
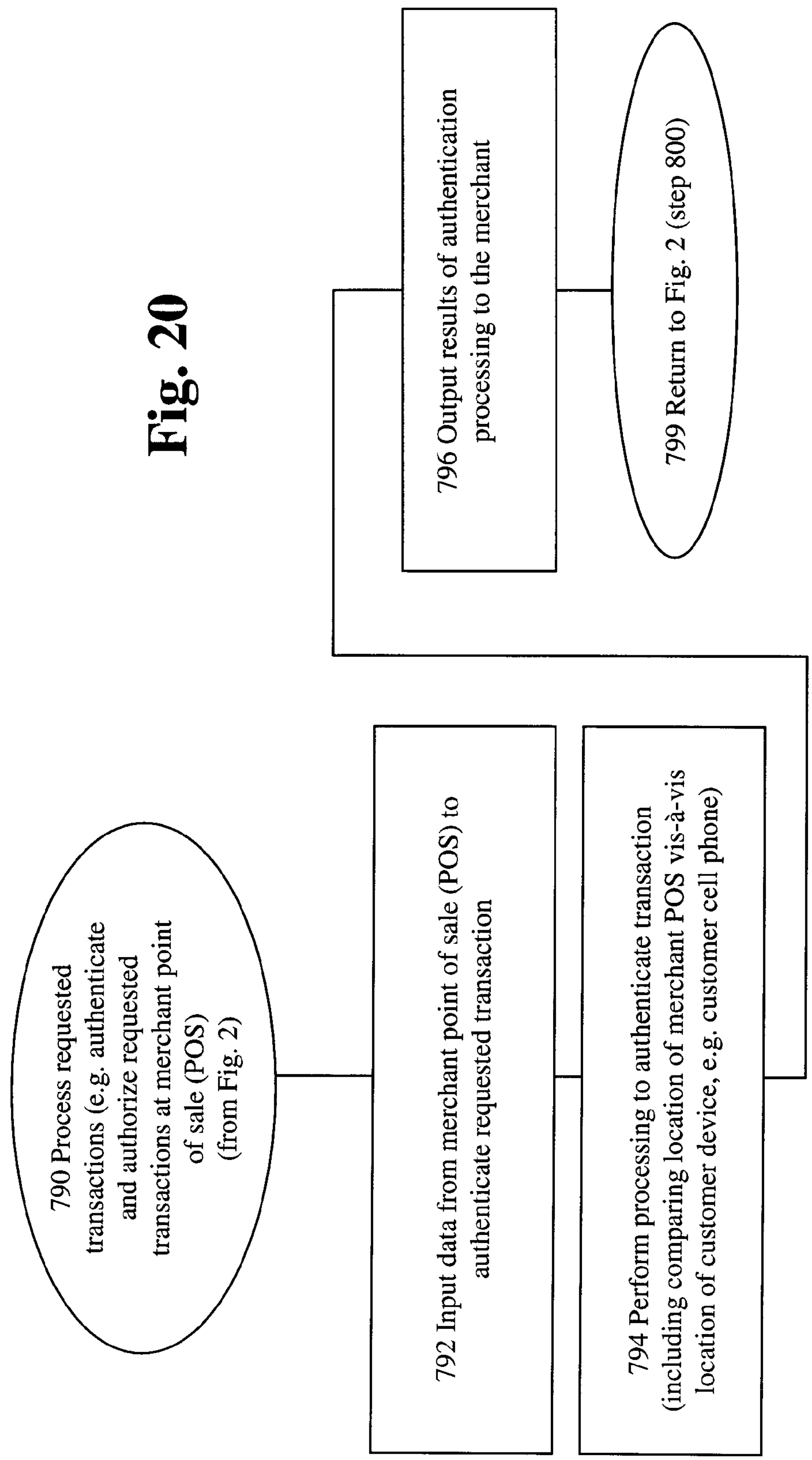
FIG. 20 is a flow chart that shows further details of the "process requested transactions" step of FIG. 2, in accordance with one embodiment of the invention.

FIG. 20 is a flow chart showing further details of step 790, as described above with reference to FIG. 2. That is, step 790 reflects that the processing may include processing a requested transaction. Thus, an entity that performs the various customer service oriented informational requests, as described herein, may well also process a requested transaction. In particular, such entity might be an authentication entity that authenticates and authorizes a requested transaction performed at a merchant point of sale (POS).

As shown, the processing of FIG. 20 starts in step 790, and then passes to step 792. In step 792, the process inputs data from a merchant point of sale (POS) to authenticate a requested transaction. Then, in step 794, processing is performed to authenticate the transaction. Such authentication processing may utilize various known techniques, as would be understood by the one of ordinary skill in the art. However, in accordance with embodiments of the invention, such processing may include comparing a location of the merchant POS vis-à-vis a location of a customer device, e.g. customer cell phone. Such features are described below.

After step 794 of FIG. 20, the process passes to step 796. In step 796, the process outputs results of the authentication processing to the merchant. Then, in step 799, the process returns to FIG. 2 (step 800).

In accordance with various embodiments of the invention described above, the position of the customer is monitored so as to provide the customer a variety of information regarding potential purchase of a product. In accordance with some embodiments of the invention, the position of the customer, i.e., the physical location of the customer, may also be used for fraud prevention, as reflected in step 794 of FIG. 20.

For example, processing may be used that compares the location of a cell phone/phone of the customer vis-à-vis the point of sale of a merchant at which that customer is effecting a sale. That is, the customer registers their phone and/or phone number with an authentication entity, such as a bank, or other suitable entity. When that customer's credit card (or some other card) is used, then based on certain criteria (e.g. size of transaction, etc), the authentication entity checks if the merchant POS location is at the same place as the phone of the particular customer.

The location of the customer's phone may be determined based on any of a variety of known techniques, such as for example the last location that a call was made using the phone. Further, it is known to provide phones with GPS capability, such that the location of the phone is then used to provide the phone's user with related information, such as desired vendors near the location of the phone.

Illustratively, in accordance with one embodiment of the invention, if the authentication entity determines that the merchant POS, at which the customer's card is being used, is near the train station in Wilmington, but the customer's phone is at the courthouse 5 blocks away, then certain responsive action may be taken. For example, the authentication entity may decline the transaction or the authentication entity may contact the merchant, so as to advise the customer to call into the authentication entity so as to verify the transaction.

Various rules, i.e., protocols, may be utilized in conjunction with the above processing relating to comparing the customer phone location vis-à-vis merchant POS location. For example, a rule may be invoked that such processing would only be utilized if a certain dollar amount were involved, e.g. the customer's purchase was over $50. Further, rules may be used that relate to exceptions in the phone's location needing to be at the same location as the POS. For example, it is not uncommon for a phone to be left at particular locations, such as at home, work, in a car or otherwise. Thus, the rules would allow such alternative locations. In other words, the authentication check of comparing the POS vis-à-vis the location of the customer's phone would be disregarded if it was determined that the customer's phone was not with the customer, but rather at some other expected location.

In accordance with one embodiment of the invention, the dollar amount may be tied with the acceptable alternative locations of the customer's phone in some graduated manner. For example, if the purchase is under $500, then the processing will allow the purchase to go through uninterrupted if the phone is not with the customer, but rather at the customer's home, or at the customer's work, or in the customer's car (assuming the location of the car can be determined). On the other hand, if the purchase is $500 or greater, then the processing would demand that the phone indeed be with the customer, else further authentication will be needed from the customer, i.e., the customer will be requested to call into the authentication entity before the transaction will be processed.

The POS location may well be a physical merchant location. However, other types of POS may be used in such processing. For example, if the customer is effecting the purchase through their computer, and the location of the computer is determinable or some how known (such as via the customer advising the authentication entity), then such POS/computer location may be compared with the customer's phone location, as described above.

In accordance with further embodiments of the invention, an application may be provided that wakes up the phone in conjunction with processing the transaction. The customer may then be prompted to accept/decline the transaction.

The processing of checking the POS vis-à-vis the location of a customer device, as described above, has been described in the context of a phone, and in particular a cell phone. However, other customer devices may be used in the processing (in lieu of a cell phone), such as a PDA, or any other customer device via which location may be monitored and compared with a POS location (at which the customer is effecting a purchase).

As described herein, "data" and "information" have been used interchangeably.

Various parameters including constraints, preferences, and other information are described above. Such described parameters including constraints, preferences, and other information may be used with any of the various processing as described herein. That is, parameters including constraints, preferences, and other information, that are described in conjunction with one process may be used, as desired, with any of the other processing described herein.

Hereinafter, general aspects of implementation of the systems and methods of the invention will be described.

As described above, FIGS. 18 and 19 show embodiments of the system of the invention. Further, FIGS. 1-17 show various processes of embodiments of the method of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method that uses transaction data to provide information to a customer, the information being provided in response to a request from the customer to assist the customer in decisioning, the method comprising;

inputting transaction data, by a tangibly embodied processing system, regarding a plurality of transactions effected at a plurality of merchants;

inputting, by the processing system, a request for information from a requesting customer, the request including parameters related to the request;

performing processing, by the processing system, based on both the transaction data and the request for information, the processing including generating a response to the request, and the generating the response to the request including determining similarly situated customer information based on (a) the transaction data that was input and (b) the request for information from the customer as such request for information relates to similarities of the customer vis-à-vis other customers, and the determining the similarly situated customer information including comparing parameters, of the customer, vis-à-vis other customer parameters associated with the other customers to determine the similarly situated customer information; and outputting, by the processing system, the response to the requesting customer, the response including the similarly situated customer information;

the processing further including determining an indicator of transaction congestion at a physical store of each of the plurality of merchants, the indicator of transaction congestion based on the transaction data that was input and the request for information from the customer as such request for information relates to the store transaction data.

2. The method of claim 1, wherein the determining the similarly situated customer information includes identifying similar customers; and information related to the identification of similar customers is included in the similarly situated customer information.

3. The method of claim 1, wherein the determining the similarly situated customer information includes determining what activities are engaged in by the similar customers, and including information of such identified activities in the similarly situated customer information that is output to the requesting customer.

4. The method of claim 3, wherein the parameters include a plurality of variables, and the processing including the requesting customer ranking the parameters using a weighting, the ranking of the parameters used in determining which other customers are similar to the requesting customer.

5. The method of claim 3, the determining the similarly situated customer information includes associating other customers with respective activities of such other customers through a mapping process.

6. The method of claim 1, wherein the parameters include a plurality of variables, and the requesting customer ranks the weight that the parameters are accorded in determining which other customers are similar to the requesting customer.

7. The method of claim 1, the comparing parameters includes running a comparison for a plurality of similarity parameters to determine a comparison value for each similarity parameters, and each similarity parameter including (a) a customer parameter and (b) a corresponding other customer parameter.

8. The method of claim 7, the processing further including interfacing with the customer to establish a ranking for each similarity parameter.

9. The method of claim 8, the interfacing with the customer to establish a ranking for each similarity parameter including the customer assigning a weight to each similarity parameter.

10. The method of claim 8, the comparing parameters further including assessing the comparison value for each similarity parameter vis-à-vis the ranking for each similarity parameter.

11. The method of claim 10, the assessing the comparison value for each similarity parameter vis-à-vis the ranking for each similarity parameter includes:

multiplying the comparison value for each similarity parameter by the ranking for each similarity parameter so as to determine a calculated rank value for each similarity parameter.

12. The method of claim 1, wherein the determining the similarly situated customer information includes identifying merchants shopped at by similar customers; and information related to the identifying merchants shopped at by similar customers is included in the similarly situated customer information.

13. The method of claim 1, the identifying merchants shopped at by similar customers includes identifying restaurants shopped at by similar customers.

14. The method of claim 1, wherein the determining the similarly situated customer information includes assigning the requesting customer to a category, and determining similar customers based on other customers that are in the same category.

15. The system of claim 1, wherein the customer is a person.

16. The system of claim 1, wherein the customer is a credit card holder.

17. A method that uses transaction data to provide information to a customer, the information being provided in response to a request from the customer to assist the customer in decisioning, the method comprising;

inputting transaction data, by a tangibly embodied processing system, regarding a plurality of transactions effected at a plurality of merchants;

inputting, by the processing system, a request for information from a requesting customer, the request including parameters related to the request;

performing processing, by the processing system, based on both the transaction data and the request for information, the processing including generating a response to the request, and the generating the response to the request including determining similarly situated customer information based on (a) the transaction data that was input and (b) the request for information from the customer as such request for information relates to similarities of the customer vis-à-vis other customers, and the determining the similarly situated customer information including comparing parameters, of the customer, vis-à-vis other customer parameters associated with the other customers to determine the similarly situated customer information; and outputting, by the processing system, the response to the requesting customer, the response including the similarly situated customer information wherein the request further relates to identifying a merchant to shop at a particular time, such time selected by the customer; and the performing processing based on both the transaction data and the request for information includes determining the frequency of transactions at the plurality of merchants, the plurality of merchants identified by the customer in the request for information, and the performing processing including identifying the optimum merchant from the plurality of merchants, the optimum merchant constituted by a single merchant that is determined by the processing to be most desirable based on one or more parameters.

18. The method of claim 17, wherein a listing of merchants is generated and output to the customer in the similarly situated customer information, the listing reflecting availability of each of the plurality of merchants to process an in-store transaction.

19. A system that processes transaction data to provide information to a customer, the information being provided in response to a request from the customer to assist the customer in decisioning, the system comprising;

a computer processor that performs processing including:

inputting transaction data regarding a plurality of transactions effected at a plurality of merchants;

each of the plurality of merchants constituted by a physical store in which persons effect transactions to generate store transaction data for that particular merchant, a processing system, for each of the plurality of merchants, respectively inputting store transaction data for that particular merchant, and the store transaction data, from the plurality of merchants, collectively constituting the transaction data;

inputting a request for information from a requesting customer, the request including parameters related to the request; and performing processing based on both the transaction data and the request for information, the processing including generating a response to the request; and outputting the response to the requesting customer through the communications portion; and the generating a response to the request including determining similarly situated customer information based on (a) the transaction data that was input and (b) the request for information from the customer as such request for information relates to similarities of the customer vis-à-vis other customers, and the determining the similarly situated customer information including comparing parameters, of the customer, vis-à-vis other customer parameters associated with the other customers to determine the similarly situated customer information;

the processing further including determining an indicator of transaction congestion at a physical store of each of the plurality of merchants, the indicator of transaction congestion based on the transaction data that was input and the request for information from the customer as such request for information relates to the store transaction data.

* * * * *